(12) United States Patent
Dollmeyer et al.

(10) Patent No.: US 6,705,301 B2
(45) Date of Patent: Mar. 16, 2004

(54) SYSTEM FOR PRODUCING CHARGE FLOW AND EGR FRACTION COMMANDS BASED ON ENGINE OPERATING CONDITIONS

(75) Inventors: Thomas A. Dollmeyer, Columbus, IN (US); Larry J. Brackney, Columbus, IN (US); George A. Brunemann, Cincinnati, OH (US); Steve Charlton, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 5 days.

(21) Appl. No.: 10/059,619

(22) Filed: Jan. 29, 2002

(65) Prior Publication Data

US 2003/0140906 A1 Jul. 31, 2003

(51) Int. Cl.⁷ ............................................... F02M 25/07
(52) U.S. Cl. .................................................. 123/568.22
(58) Field of Search ................... 123/568.21, 568.16, 123/568.12, 568.11, 568.22, 568.13, 568.14, 568.17; 701/108; 60/600, 602, 605.2, 606, 607, 608

(56) References Cited

U.S. PATENT DOCUMENTS

| | | | |
|---|---|---|---|
| 4,014,302 A | 3/1977 | Houston | |
| 4,223,650 A | 9/1980 | Herbert | |
| 4,323,045 A | 4/1982 | Yamashita | |
| 4,426,848 A | 1/1984 | Stachowicz | |
| 4,446,840 A | 5/1984 | Nakagawa et al. | |
| 4,452,217 A | 6/1984 | Kawamura et al. | |
| 4,898,143 A | * | 2/1990 | Fujimoto et al. ...... 123/568.22 |
| 5,150,696 A | 9/1992 | Kabasin et al. | |
| 5,203,311 A | 4/1993 | Hitomi et al. | |
| 5,440,880 A | 8/1995 | Ceynow et al. | |
| 5,456,280 A | 10/1995 | Palmer | |
| 5,490,488 A | 2/1996 | Aversa et al. | |
| 5,546,915 A | 8/1996 | Isobe | |
| 5,601,068 A | 2/1997 | Nozaki | |
| 5,617,726 A | 4/1997 | Sheridan et al. | |
| 5,657,630 A | 8/1997 | Kjemtrup et al. | |
| 5,669,365 A | 9/1997 | Gartner et al. | |
| 5,732,688 A | 3/1998 | Charlton et al. | |
| 5,740,786 A | 4/1998 | Gartner | |
| 5,771,868 A | 6/1998 | Khair | |
| 5,802,846 A | 9/1998 | Bailey | |
| 5,806,308 A | 9/1998 | Khair et al. | |
| 5,931,131 A | 8/1999 | Hackett | |
| 6,480,782 B2 | * | 11/2002 | Brackney et al. ............ 701/108 |

* cited by examiner

*Primary Examiner*—Tony M. Argenbright
*Assistant Examiner*—Hyder Ali
(74) *Attorney, Agent, or Firm*—Barnes & Thornburg

(57) ABSTRACT

A combustion manager portion of an engine controller is responsive to ambient air density and engine temperature signals to schedule charge flow and EGR fraction commands. The combustion manager includes a data structure determination block operable to select an appropriate engine speed/engine fueling data structure based on air density and engine temperature information as well as on desired emissions level and engine operating state (i.e., steady state or transient) information. Charge flow and EGR fraction determination blocks are, in turn, responsive to current engine speed and engine fueling information to produce compute the EGR fraction and charge flow commands as a function of the selected engine speed/engine fueling data structures.

10 Claims, 15 Drawing Sheets

SYSTEM FOR PRODUCING CHARGE FLOW AND EGR FRACTION COMMANDS BASED ON ENGINE OPERATING CONDITIONS

FIELD OF THE INVENTION

The present invention relates generally to systems for managing charge flow and EGR fraction in an EGR control system for an internal combustion engine, and more specifically to such systems for determining and producing desired charge flow and EGR fraction commands based on current engine operating conditions.

BACKGROUND OF THE INVENTION

Systems for controlling EGR flow and/or turbocharger swallowing capacity are known and have been widely implemented, particularly in the heavy diesel engine industry. An example of one known system 10 for providing such control is shown in FIG. 1 and includes an internal combustion engine 12 having an intake manifold 14 fluidly coupled to a compressor 18 of a turbocharger 25 via intake conduit 16, wherein the compressor 18 receives fresh air via intake conduit 20. The turbocharger compressor 18 is mechanically coupled to a turbocharger turbine 24 via drive shaft 22, wherein turbine 24 is fluidly coupled to an exhaust manifold 28 of engine 12 via exhaust conduit 30, and is further fluidly coupled to ambient via exhaust conduit 26. An EGR valve 32 is disposed in fluid communication with the intake conduit 16 and the exhaust conduit 30, and a differential pressure sensor, or ΔP sensor, 34 is disposed across the EGR valve 32 to sense a pressure change, or delta pressure, across valve 32. An electronic EGR flow controller 36 has a first input receiving a signal indicative of desired EGR valve position, and has a first output electrically connected to EGR valve 32 via signal path 38. In the system shown in FIG. 1, the EGR flow controller is configured to apply the EGR position signal directly to the EGR valve 32. Controller 36 includes a second input receiving a signal indicative of a desired delta pressure value, or ΔP target, and a third input electrically connected to the ΔP sensor 34 via signal path 40 and receiving a signal thereat indicative of sensed delta pressure (ΔP). The ΔP value is subtracted from the ΔP target value at summing node 42, and a ΔP error value produced thereby is applied to a proportional-integral (PI) or other known controller 44. An output of controller 44 produces a variable geometry turbocharger signal VGT that is used to control the swallowing capacity and/or efficiency of the turbocharger 25 via any of a number of known techniques via signal path 46. In operation, charge flow to the intake manifold 14 of engine 12, defined for the purposes of the present invention as the sum of fresh air flow into intake conduit 16 and EGR flow into intake conduit 16, is controlled via control of the position of the EGR valve 32 and the pressure differential between the exhaust conduit 30 and intake conduit 16.

One drawback associated with an EGR flow control system 10 of the type illustrated in FIG. 1 is that there exists an interdependency between charge flow and EGR flow such that EGR flow and fresh air flow cannot be controlled separately. Once EGR flow is established by the EGR flow controller 36, the resulting charge flow is defined by whatever fresh air flow is available. System 10 may therefore be optimized for NOx control or for particulate control, but generally not for both. It is accordingly desirable to provide for an EGR control system wherein EGR flow and fresh air flow may be controlled separately to therefore gain better and more consistent control over the charge flow. Systems for achieving this goal are described U.S. Pat. No. 6,408,834, entitled SYSTEM FOR DECOUPLING EGR FLOW AND TURBOCHARGER SWALLOWING CAPACITY/EFFICIENCY CONTROL MECHANISMS, and U.S. Pat. No. 6,480,782, entitled SYSTEM FOR MANAGING CHARGE FLOW AND EGR FRACTION IN AN INTERNAL COMBUSTION ENGINE, both of which are assigned to the assignee of the present invention and the disclosures of which are incorporated herein by reference.

In such systems, however, it is further desirable to provide target steady-state charge flow and EGR fraction commands across a wide range of operating conditions in order to optimize engine performance while also constraining engine emissions below specified limits. What is therefore needed is a control strategy operable to provide such target charge flow and EGR fraction commands to manage steady-state engine performance across a wide range of ambient and application conditions, while complying with emissions regulations that vary across those same and other conditions.

SUMMARY OF THE INVENTION

The foregoing shortcomings of the prior art are addressed by the present invention. In accordance with one aspect of the present invention, a system for producing charge flow and EGR fraction commands comprises means for determining a current ambient air density, means for determining a current operating temperature of an internal combustion engine, a memory unit having a number of data sets stored therein, each data set including a subset of charge flow and EGR fraction command values optimized for either of a unique ambient pressure and a unique engine operating temperature, and an engine controller configured to select a first one of said number of said data sets having an associated unique ambient pressure or engine operating temperature that is less than or equal to a corresponding one of said current ambient air density and said current operating temperature, and to select a second one of said number of data sets having an associated unique ambient pressure or engine operating temperature that is greater than or equal to a corresponding one of said current ambient air density and said current operating temperature, said engine controller interpolating between said first and second data sets to produce charge flow value and EGR fraction commands.

One object of the present invention is to provide a system for generating charge flow and EGR fraction commands based on one or more engine operating conditions.

Another object of the present invention is to provide such a system operable to generate such commands based on current ambient air density and/or engine temperature.

These and other objects of the present invention will become more apparent from the following description of the preferred embodiment.

DESCRIPTION OF THE PREFERRED EMBODIMENTS

Figure 1:
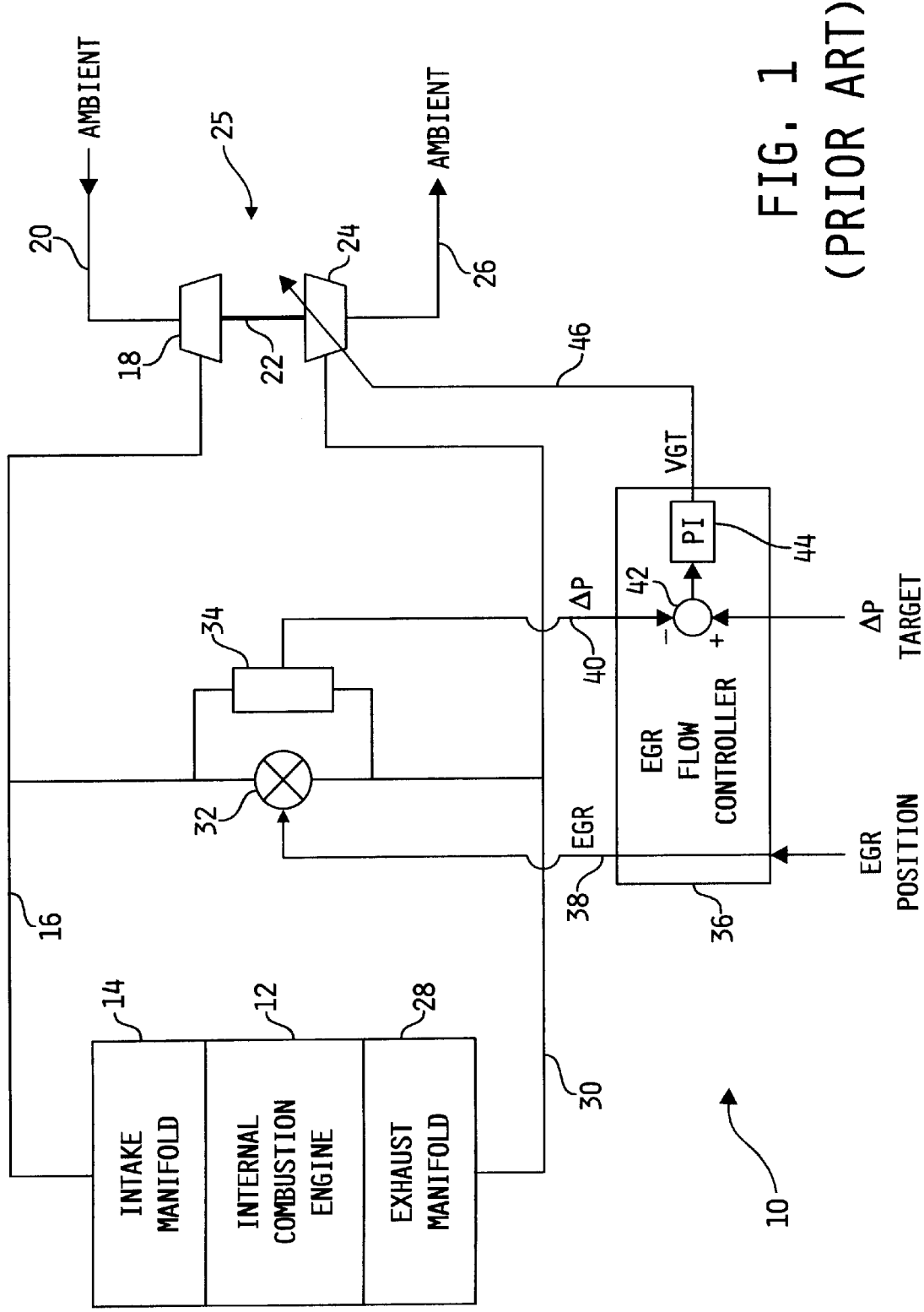
FIG. 1 is a diagrammatic illustration of one known EGR and turbocharger swallowing capacity control system for an internal combustion engine.

For the purposes of promoting an understanding of the principles of the invention, reference will now be made to a number of preferred embodiments illustrated in the drawings and specific language will be used to describe the same. It will nevertheless be understood that no limitation of the scope of the invention is thereby intended, such alterations and further modifications in the illustrated embodiments, and such further applications of the principles of the invention as illustrated therein being contemplated as would normally occur to one skilled in the art to which the invention relates.

Figure 2:
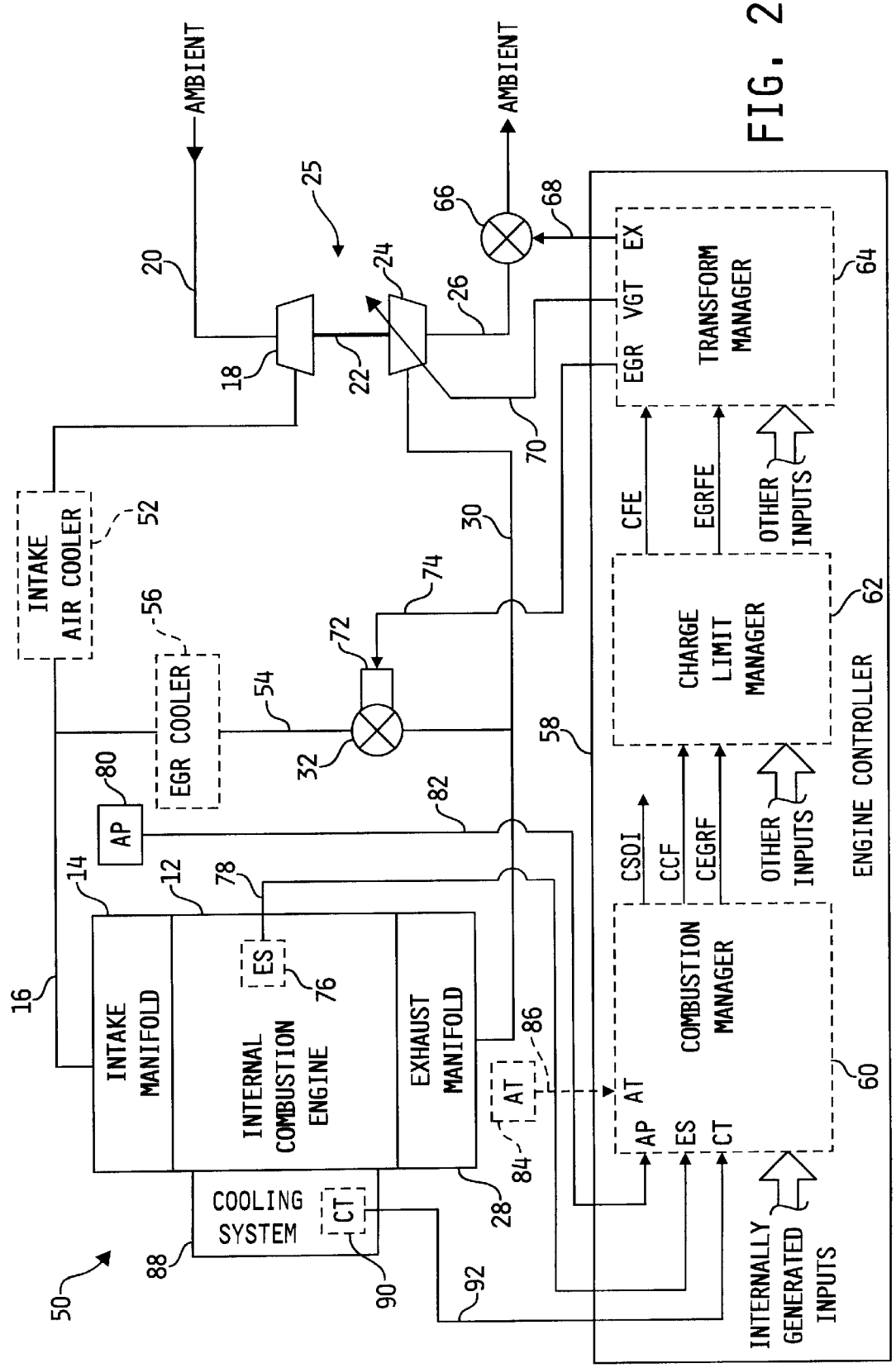
FIG. 2 is a diagrammatic illustration of one preferred embodiment of a system for generating charge flow and EGR fraction commands for use in controlling the operation of in an internal combustion engine, in accordance with the present invention.

Referring now to FIG. 2, one preferred embodiment of a system 50 for generating charge flow and EGR fraction commands for use by a charge flow and EGR fraction control system for an internal combustion engine, in accordance with the present invention, is shown. System 50 includes several components in common with system 10 of FIG. 1, and like numbers are therefore used to identify like components. For example, system 50 includes an internal combustion engine 12 having an intake manifold 14 fluidly coupled to a compressor 18 of a turbocharger 25 via intake conduit 16, wherein the compressor 18 receives fresh air via intake conduit 20. Optionally, as shown in phantom in FIG. 2, system 50 may include an intake air cooler 52 of known construction disposed in line with intake conduit 16 between the turbocharger compressor 18 and the intake manifold 14. The turbocharger compressor 18 is mechanically coupled to a turbocharger turbine 24 via drive shaft 22, wherein turbine 24 is fluidly coupled to an exhaust manifold 28 of engine 12 via exhaust conduit 30, and is further fluidly coupled to ambient via exhaust conduit 26. An EGR valve 32 or other flow restriction mechanism is disposed in fluid communication with an EGR conduit 54 positioned in fluid communication with the intake conduit 16 and the exhaust conduit 30, and an EGR cooler 56 of known construction may optionally be disposed in-line with conduit 54 between EGR valve 32 and intake conduit 16 as shown in phantom in FIG. 2.

System 50 includes an engine controller 58 that is preferably microprocessor-based and is generally operable to control and manage the overall operation of engine 12. Engine controller 56 includes a memory unit (not shown) as well as a number of inputs and outputs for interfacing with various sensors and systems coupled to engine 12. Controller 58, in one embodiment, may be a known control unit sometimes referred to as an electronic or engine control module (ECM), electronic or engine control unit (ECU) or the like, or may alternatively be a control circuit capable of operation as described hereinafter.

In accordance with the present invention, engine controller 58 includes a combustion manager block 60 receiving a number of input signals and producing commanded start-of-injection (CSOI), charge flow (CCF) and EGR fraction (CEGRF) values as will be described in greater detail hereinafter. Engine controller 58 further includes a charge limit manager 62 receiving the commanded charge flow (CCF) and commanded EGR fraction (CEGRF) values from the combustion manager block 60 as well as other input signals, and producing charge flow error (CFE) and EGR fraction error (EGRFE) values as functions thereof. Preferably, the charge limit manager 62 includes a control strategy operable to arbitrate between the commanded charge flow and EGR fraction values (CCF and CEGRF) produced by block 60 and the corresponding capabilities of the engine's air handling system (i.e., EGR and/or turbocharger control mechanisms), and produce the charge flow error (CFE) and EGR fraction error (EGRFE) output values as functions thereof, and one such control strategy particularly suitable for use with the present invention is described in U.S. Pat. No. 6,480,782, entitled SYSTEM FOR MANAGING CHARGE FLOW AND EGR FRACTION IN AN INTERNAL COMBUSTION ENGINE, the disclosure of which was previously incorporated herein by reference.

A transform manager block 64 is also included within the engine controller 58 and is responsive to the charge flow error (CFE) and EGR fraction error (EGRFE) values produced by the charge limit manager 62, as well as to a number of other input signals, to produce a number of EGR system/turbocharger control signals EGR, VGT and EX for controlling EGR flow and/or turbocharger swallowing capacity/efficiency. For example, an EGR output of transform manager 64 is electrically connected to an actuator 72 of EGR valve 32 via signal path 74, wherein the EGR valve actuator 72 is responsive to the EGR signal on signal path 74 to establish a corresponding position of EGR valve 32, and hence a desired cross-sectional flow area therethrough. A variable geometry turbocharger (VGT) output of transform manager 64 is electrically connected to a turbocharger actuating mechanism via signal path 70, wherein the turbocharger actuating mechanism may include an actuator for modulating the geometry of the turbocharger turbine 24 and/or a wastegate for controllably routing exhaust gas around turbine 24 between exhaust conduits 30 and 26. Finally, an exhaust throttle output (EX) of transform manager 64 is electrically connected to an exhaust valve 66 disposed in-line with exhaust conduit 26 between the turbocharger turbine 24 and ambient. Exhaust valve 66 is responsive to the EX signal to establish a corresponding position of exhaust valve 66, and hence a desired cross-sectional flow area therethrough. It is to be understood that if the turbocharger actuating mechanism includes a wastegate, the output of the wastegate may be connected either upstream or downstream with respect to the exhaust throttle 66.

The transform manager 64 is used to control any one, or combination of, the foregoing flow control actuators including the EGR valve 32 (via the EGR output thereof), the exhaust throttle 66 (via the EX output thereof) and any of a number of variable geometry turbocharger actuators (via the VGT output thereof). Details relating to one preferred embodiment of such a transform manager particularly suited for use with the present invention are provided in U.S. Pat. No. 6,408,834, entitled SYSTEM FOR DECOUPLING EGR FLOW AND TURBOCHARGER SWALLOWING CAPACITY/EFFICIENCY CONTROL MECHANISMS, the disclosure of which was previously incorporated herein by reference.

System 50 also includes a number of sensors and/or sensing systems for providing the engine controller 58 with information relating to the operation of engine 12. For example, engine 12 includes an engine speed sensor 76 of known construction that is electrically connected to an engine speed input (ES) of the combustion manager 60 via signal path 78. Engine speed sensor 76 is operable to produce an engine speed signal indicative of engine rotational speed, and in one embodiment, sensor 76 is a Hall effect sensor operable to determine engine speed by sensing passage thereby of a number of equi-angularly spaced teeth formed on a gear or tone wheel. Alternatively, engine speed sensor 76 may be any other known sensor operable to produce an engine speed signal including, but not limited to, a variable reluctance sensor or the like.

System 50 further includes an ambient pressure sensor (AP) 80 of known construction suitably disposed relative to engine 12 and electrically connected to an ambient pressure (AP) input of the combustion manager block 60 via signal path 82. Sensor 80 is operable to, as is known in the art, to produce an ambient pressure signal on signal path 82 indicative of the pressure of ambient air. System 50 may optionally include an ambient temperature sensor (AT) 84 suitably disposed relative to engine 12 and electrically connected to an ambient temperature (AT) input of the combustion manager block 60 of engine controller 58 via signal path 86 as shown in phantom in FIG. 2. If included, ambient temperature sensor 84 is preferably a known sensor operable to produce a temperature signal on signal path 86 indicative of the temperature of ambient.

Engine 12 includes a cooling system 88 of known construction and operation, and system 50 further includes an engine coolant temperature (CT) sensor 90 in fluid communication therewith and electrically connected to a coolant temperature (CT) input of the combustion manager block 60 of engine controller 58 via signal path 92. The coolant temperature sensor 90 may be any known sensor operable to sense coolant temperature, and to provide a temperature signal on signal path 92 indicative of engine operating temperature. Alternatively, engine 14 may be outfitted with an engine temperature sensor operable to produce a temperature signal indicative of engine operating temperature, and in this embodiment the temperature signal produced by the engine temperature sensor may replace the coolant temperature signal as the CT input to the combustion manager 60.

Figure 3:
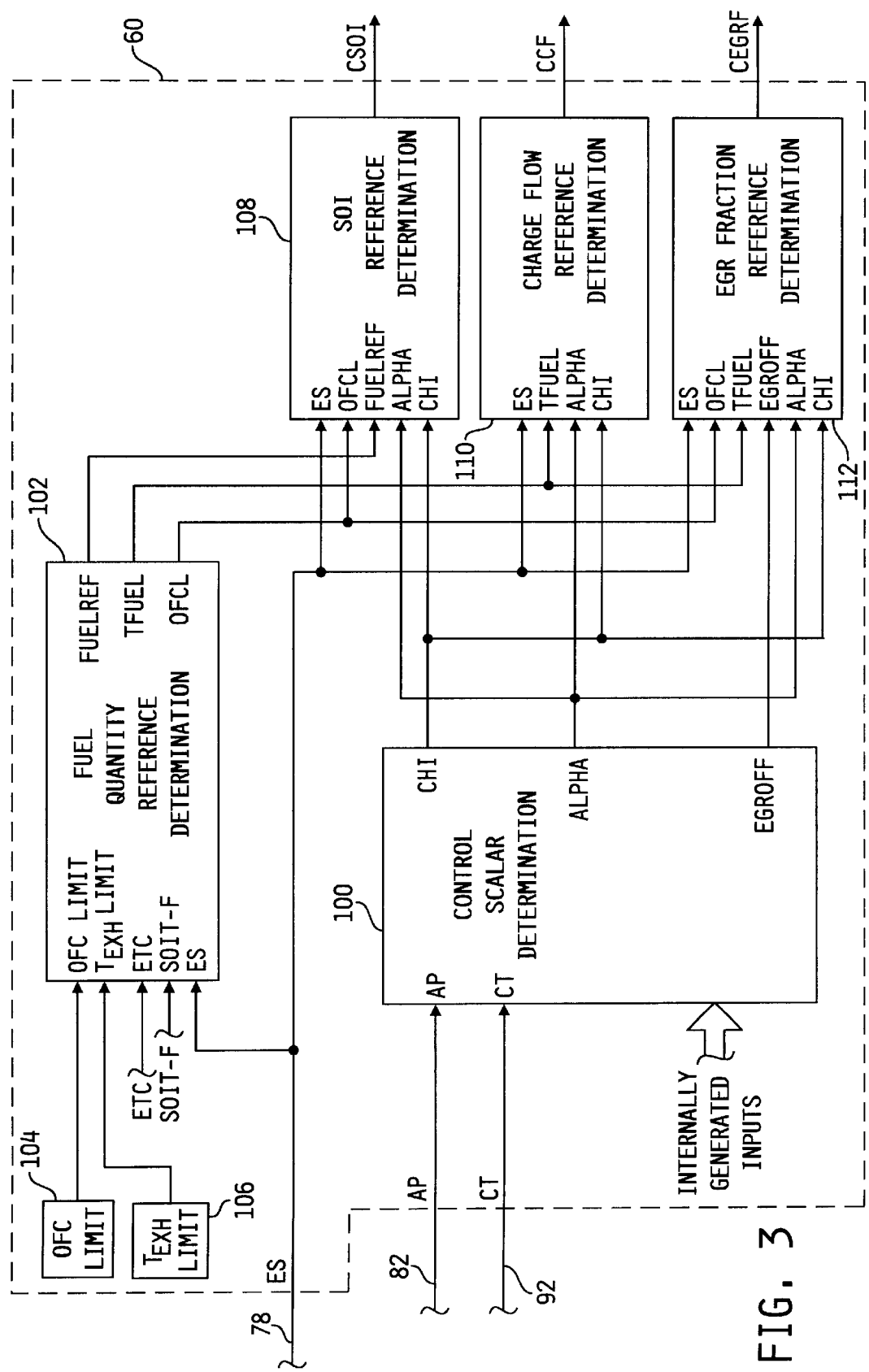
FIG. 3 is a diagrammatic illustration of one preferred embodiment of the combustion manager block of FIG. 2, in accordance with the present invention.

Referring now to FIG. 3, one preferred embodiment of the combustion manager block 60 of engine controller 58, in accordance with the present invention, is shown. Block 60 includes a control scalar determination block 100 having a first input receiving the ambient pressure signal (AP) via signal path 82, a second input receiving the coolant temperature signal via signal path 92, and a number of additional inputs receiving signals or values generated internally to block 60 and/or internally to engine controller 58. The control scalar determination block 100 is operable, as will be described in greater detail hereinafter, to produce a chi data structure, an alpha value and an EGR off signal at corresponding CHI, ALPHA and EGROFF outputs thereof. In general, the chi data structure corresponds to air density and/or engine temperature and/or engine emission-related reference information for determining start-of-injection (SOI), charge flow and EGR fraction commands under steady state engine operating conditions, the alpha value corresponds to similar reference information under transient engine operating conditions, and the EGR off value represents a binary value indicative of whether any, or no, EGR fraction is to be commanded.

Block 60 further includes a fuel quantity reference determination block 102 having an engine speed input (ES) receiving the engine speed signal produced by sensor 76 on signal path 78, an engine torque command input (ETC) receiving a base fuel-torque relationship value generated by engine controller 58 as is known in the art, and a start-of-injection (SOI) torque-fuel input (SOIT-F) receiving a SOI torque-fuel value generated by engine controller 58, wherein this value compensates for the timing effect of the start-of-injection command on engine output torque. The SOIT-F value is typically calibrated for nominal timing of the start-of-injection command, and compensates for the fact that less torque is produced as SOI is retarded and more torque is produced as SOI is advanced. It is to be understood that both the ETC and SOIT-F signals are generally known in the art and are typically produced by engine controller 58 pursuant to conventional fuel calculating algorithms. The fuel quantity reference determination block 102 further includes an OFC limit input receiving an OFC limit value from block 104. The OFC limit value corresponds to a fueling limit that is computed based on available oxygen trapped within the cylinders of the engine 12. The OFC limit value is preferably estimated in accordance with an OFC limit estimation algorithm, wherein an example of such an algorithm particularly suited for use with the present invention is described in U.S. Pat. No. 6,508,241, entitled AN EQUIVALENCE RATIO-BASED SYSTEM FOR CONTROLLING TRANSIENT FUELING IN AN INTERNAL COMBUSTION ENGINE, which is assigned to the Assignee of the present invention, and the disclosure of which is incorporated herein by reference. The OFC limit value is preferably estimated in accordance with an OFC limit estimation algorithm, wherein an example of such an algorithm particularly suited for use with the present invention is described in co-pending U.S. patent application Ser. No. 09/773,068, entitled AN EQUIVALENCE RATIO-BASED SYSTEM FOR CONTROLLING TRANSIENT FUELING IN AN INTERNAL COMBUSTION ENGINE, which is assigned to the Assignee of the present invention, and the disclosure of which is incorporated herein by reference.

Block 102 further includes an exhaust temperature limit input ($T_{EXH}$ limit) receiving an exhaust temperature limit value from block 106, wherein $T_{EXH}$ is another fueling limit that is determined based on a maximum desired engine exhaust temperature. Preferably, the engine controller 58 includes an algorithm for computing the exhaust temperature limit $T_{EXH}$, and one such algorithm that is particularly suited for use in the present invention is disclosed in U.S. Pat. No. 6,550,464, entitled SYSTEM FOR CONTROLLING ENGINE EXHAUST TEMPERATURE, which is assigned to the Assignee of the present invention, and the disclosure of which is incorporated herein by reference. The fuel quantity reference determination block 102 is operable, as will be described in greater detail hereinafter, to produce a fuel reference value (FUELREF), a torque fuel value (TFUEL) and an OFC limit indicator (OFCL) at outputs FUELREF, TFUEL and OFCL respectively. In general, TFUEL is a conventional fueling reference value, FUELREF is a fueling reference value representing default (i.e., conventional) engine speed-based fueling parameters that have been limited by block 102 based on either, or both, of the OFC limit value and the $T_{EXH}$ limit value, and the OFC limit indicator OFCL is a binary value indicative of whether or not engine fueling is currently OFC limited.

Block 60 further includes a start-of-injection (SOI) reference determination block 108 having an engine speed input (ES) receiving the engine speed signal on signal path 78, an OFCL input receiving the OFC limit indicator from the OFCL output of the fuel quantity reference determination block 102, and a fuel reference input (FUELREF) receiving the fuel reference value (FUELREF) from the fuel quantity reference determination block 102. The SOI reference determination block 108 further includes an ALPHA input receiving the alpha value from the control scalar determination block 100, and a CHI input receiving the chi data structure from the control scalar determination block 100. The SOI reference determination block 108 is generally operable to generate a start-of-injection command (CSOI) based on current engine speed and engine fueling conditions (ES, FUELREF and OFCL) as well as on a current engine operating state and current engine operating conditions (CHI and ALPHA).

The combustion manager block 60 further includes a charge flow reference determination block 100 having an engine speed signal input (ES) receiving the engine speed signal on signal path 78 and a torque fuel input (TFUEL) receiving the torque fuel value from the fuel quantity reference determination block 102. Block 110 further includes ALPHA and CHI inputs receiving the alpha value and chi data structure from the control scalar determination block 100. The charge flow reference determination block 110 is operable, as will be described in greater detail hereinafter, to generate a commanded charge flow value or signal (CCF) based on current engine speed and engine fueling conditions (ES and TFUEL) as well as on a current engine operating state and current engine operating conditions (CHI and ALPHA).

The combustion manager block 60 further includes an EGR fraction reference determination block 112 having an engine speed signal input (ES) receiving the engine speed signal on signal path 78, an OFCL input and a torque fuel input (TFUEL) receiving the OFC limit indicator value (OFCL) and torque fuel (TFUEL) values from the fuel quantity reference determination block 102. As with blocks 108 and 100, the EGR fraction reference determination block 112 further includes ALPHA and CHI inputs receiving the alpha value and chi data structure from the control scalar determination block 100. The EGR fraction reference determination block 112 is operable, as will be described in greater detail hereinafter, to generate a commanded EGR fraction value (CEGRF) based on current engine speed and engine fueling conditions (ES, TFUEL and OFCL) as well as on a current engine operating state and current engine operating conditions (CHI, ALPHA and EGROFF).

Figure 4:
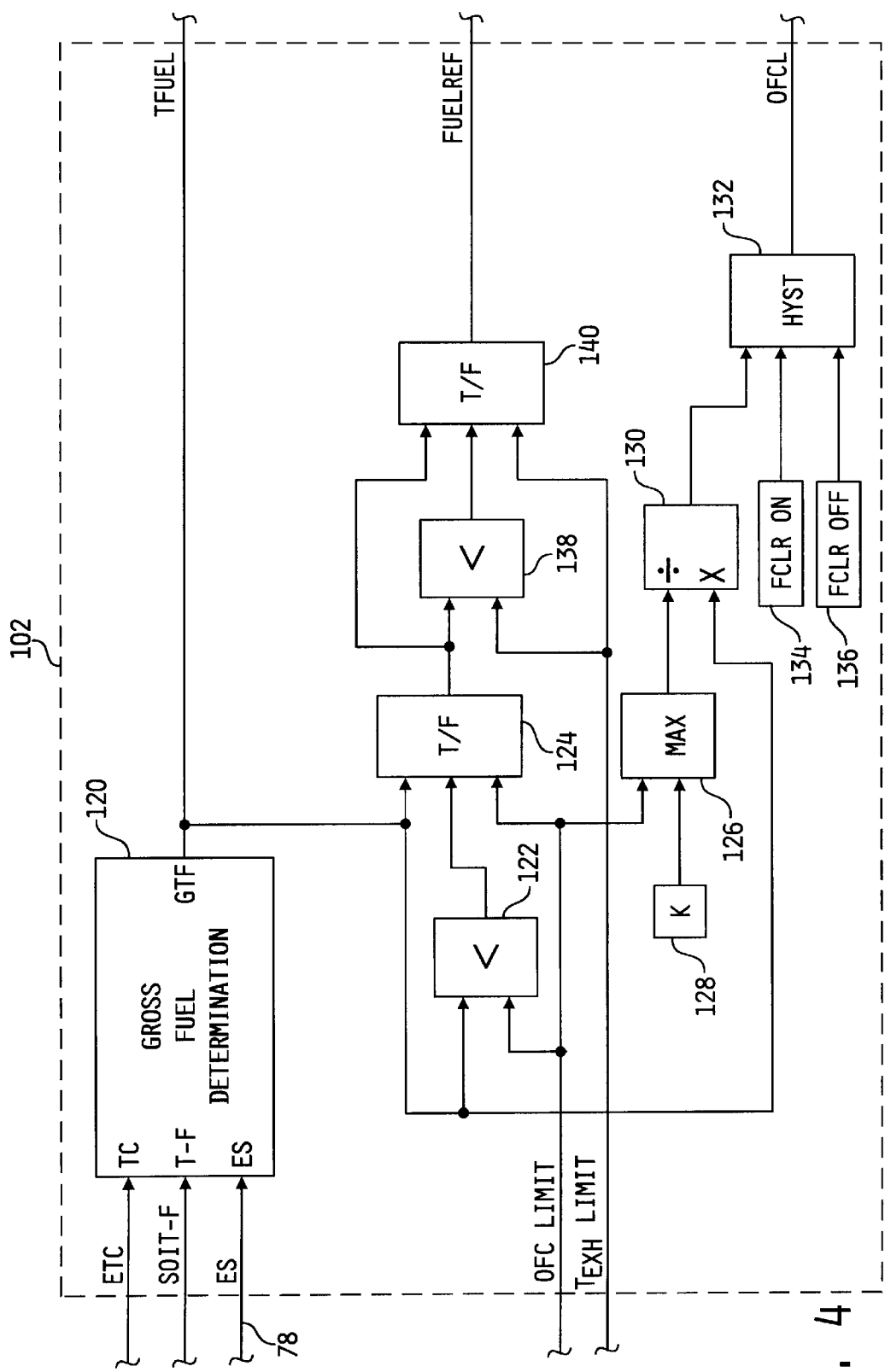
FIG. 4 is a diagrammatic illustration of one preferred embodiment of the fuel quantity reference determination block of FIG. 3, in accordance with the present invention.

Referring now to FIG. 4, one preferred embodiment of the fuel quantity reference determination block 102, in accordance with the present invention, is shown. Block 102 includes a gross fuel determination block 120 having a torque command input (TC) receiving the engine torque command (ETC), a torque fuel input (T-F) receiving the SOIT-F value and an engine speed input (ES) receiving the engine speed signal on signal path 78. The gross fuel determination block 120 is operable to produce a gross torque fuel value (GTF) as a function of the three inputs as will be described in greater detail with reference to FIG. 5. In any case, the gross torque fuel value (GTF) produced by block 120 corresponds to the torque fuel value (TFUEL) produced by block 102.

An arithmetic operator block 122 includes a first input receiving the gross torque fuel value (GTF) produced by block 120, wherein this value is further supplied to a first input of a true/false block 124. A second input of arithmetic operator block 122 receives the OFC limit value provided by block 104 (FIG. 3), and an output of arithmetic operator block 122 is connected to a second input of true/false block 124. A third input of the true/false block 124 receives the OFC limit value directly. Arithmetic operator block 122 is preferably configured as a "less than" function so that the output of block 122 is true only if the gross torque fuel value (GTF) is greater than the OFC fuel limit value. In this case, the true/false block 124 is operable to produce as its output the gross torque fuel value (GTF). If, however, the OFC limit is greater than or equal to the gross torque fuel value (GTF), the output of arithmetic block 122 is false, and the true/false block 124 will produce as its output the OFC fueling limit value.

The output of true/false block 124 is provided as a first input to another arithmetic operator block 138 and to one input of another true/false block 140. A second input of arithmetic operator block 138 receives the exhaust temperature limit value ($T_{EXH}$ limit), which is also provided as a second input to true/false block 140. The output of arithmetic operator block 138 is supplied to a third input of true/false block 140, and the arithmetic operator block 138 is preferably configured as a "less than" function. In operation, if the fueling output of true/false block 124 (i.e., either the gross torque fuel value produced by block 120 or the OFC fuel limit value produced by block 104) is less than the exhaust temperature fueling limit ($T_{EXH}$ limit), the output of block 138 is true, and the true/false block 140 is operable to produce as its output the output of true/false block 124. If, on the other hand, the exhaust temperature fueling limit ($T_{EXH}$ limit) is greater than or equal to the output of block 124, the output of arithmetic operator block 138 is false and the true/false block 140 will produce as its output the exhaust temperature fueling limit ($T_{EXH}$ limit). The output of true/false block 140 is the fuel reference value (FUELREF) produced by the fuel quantity reference determination block 102.

The OFC fueling limit value is also provided to a first input of a MAX block 126 having a second input receiving a constant K from block 128. The output of block 126 is provided to a division input of an arithmetic block 130 having a multiplication input receiving the gross torque fuel value (GTF) from block 120. MAX block 126 and constant block 128 are provided for divide-by-zero protection for block 130 in the event that the OFC limit value is equal to, or near, zero. The output of arithmetic block 130 is a ratio of the gross torque fuel value (GTF) and the OFC limit value and is provided to a first input of a hysteresis block 132 having an upper threshold input receiving a FCLR ON value from block 134 and a lower threshold input receiving a FCLR OFF value from block 136. FLCR ON and FLCR OFF thus represent the on and off thresholds for the OFC signal, and the output of hysteresis block 132 provides the OFC limit indicator output (OFCL) of the fuel quantity reference determination block 102.

Figure 5:
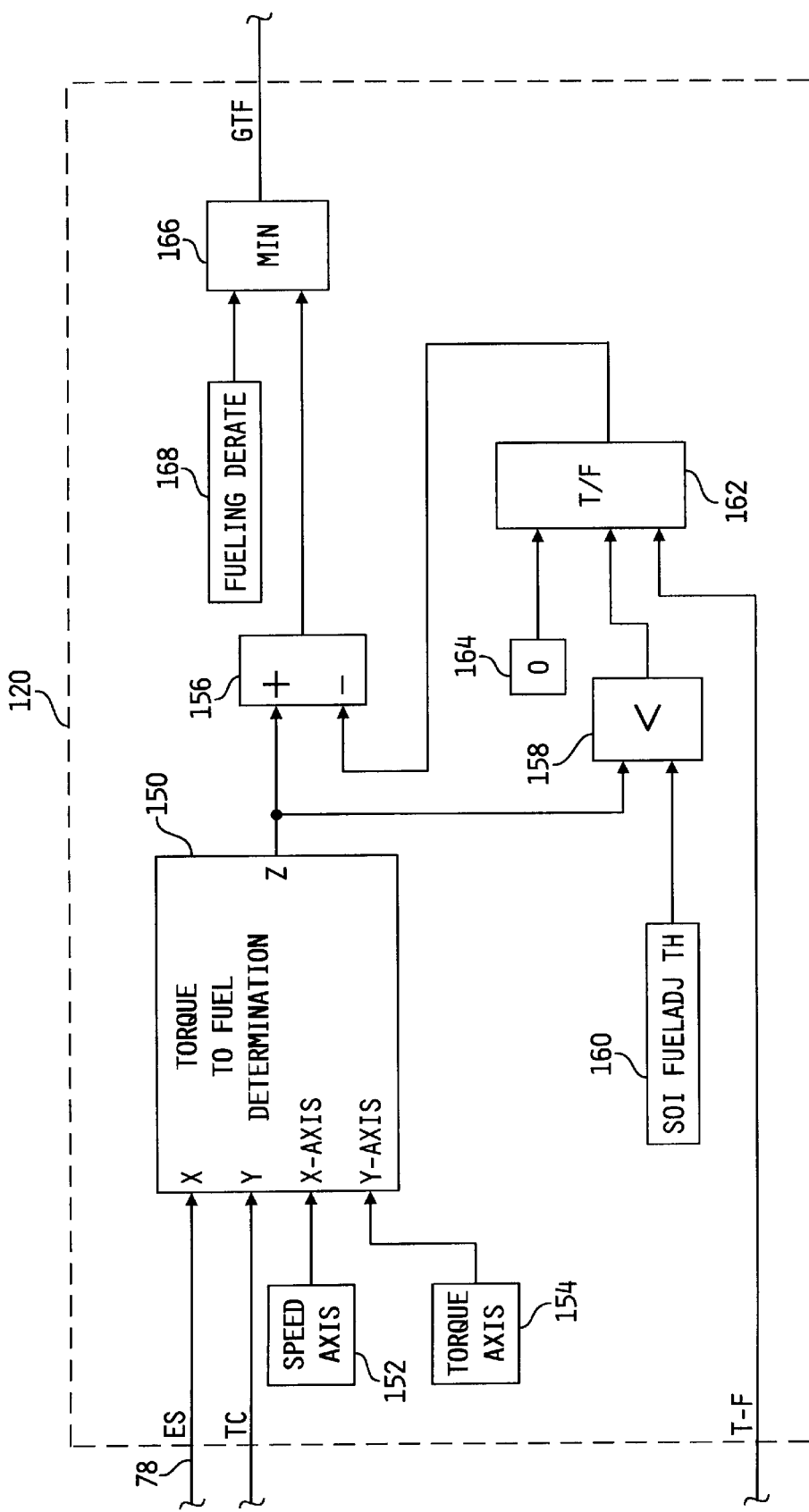
FIG. 5 is a diagrammatic illustration of one preferred embodiment of the gross fuel determination block of FIG. 4, in accordance with the present invention.

Referring now to FIG. 5, one preferred embodiment of the gross torque fuel determination block 120, in accordance with the present invention, is shown. Block 120 includes a torque-to-fuel determination block 150 having a first input (X) receiving the engine speed signal on signal path 78 and a second input (Y) receiving the engine torque command (ETC). X-axis and Y-axis inputs of determination block 150 receive speed axis break points from block 152 and torque axis break points from block 154 respectively. The torque to fuel determination block 150 is preferably a table defined by the speed axis 152 and torque axis 154, and is operable to convert the engine speed and engine torque command values to a fueling value at output Z. The output of table 150 is provided as an addition input of a summation block 156 and also to one input of an arithmetic operator block 158 having a second input receiving a start-of-injection (SOI) fuel adjustment threshold (SOI FUELADJ TH) from block 160. The arithmetic block 158 preferably represents a "less than" function such that the output thereof is true only if the fueling value produced by block 150 is less than the SOI fuel adjust threshold produced by block 160. Otherwise, the output of block 158 is false.

The output of block 158 is provided as a first input to a true/false block 162 having a second input receiving a constant value (preferably zero) from block 164 and a third input receiving the SOI torque-fuel (SOIT-F) value (FIG. 3). The output of true/false block 162 is provided to a subtraction input of summation block 156. In operation, the true/false block 162 produces the zero of block 164 at its output as long as the fueling value produced by block 150 is less than the SOI fuel adjustment threshold produced by block 160. However, if the SOI fuel adjustment threshold produced by block 160 is greater than or equal to the fueling value produced by block 150, the true/false block 162 produces as its output the SOI torque-fuel value that is then subtracted by block 156 from the fueling value produced by block 150. In either case, the output of block 156 is provided to a first input of a MIN block 166 having a second input receiving a fueling derate value from block 168. The output of MIN block 166 is the gross torque fuel value (GTF) produced by the gross torque fueling block 120 (FIG. 4), and is the minimum of the fueling value produced by block 156 and the fueling derate value produced by block 168.

It should now be apparent from the foregoing that the fuel quantity reference block 102 of the combustion manager 60 is operable to produce the torque fuel value (TFUEL) as a function of engine speed and default fueling information. The fuel reference value FUELREF, on the other hand, represents a fueling reference value that is equal to TFUEL as long as TFUEL (i.e., gross torque fuel value GTF) is less than both of the OFC and $T_{EXH}$ limits. If, however, TFUEL is less than the OFC limit but greater than or equal to the $T_{EXH}$ limit, the fuel reference value FUELREF is equal to $T_{EXH}$. Moreover, if TFUEL is greater than or equal to the OFC limit, the OFC limit is compared to the $T_{EXH}$ limit and FUELREF in this case is set to the lesser of the OFC and $T_{EXH}$ limits. In any case, FUELREF is limited to the lowest value of GTF, OFC limit and $T_{EXH}$ limit. The OFC limit indicator (OFCL) is determined based on a ratio of the gross torque fuel value (GTF) produced by block 120 and the OFC limit value. If this ratio is above a predefined threshold (FCLR ON), engine fueling is considered to be OFC limited and OFCL in this case is "true". If, on the other hand, the ratio of GTF and the OFC limit value is below another predefined threshold (FCLR OFF), engine fueling is not considered to be OFC limited and OFCL in this case is "false".

Figure 6A:
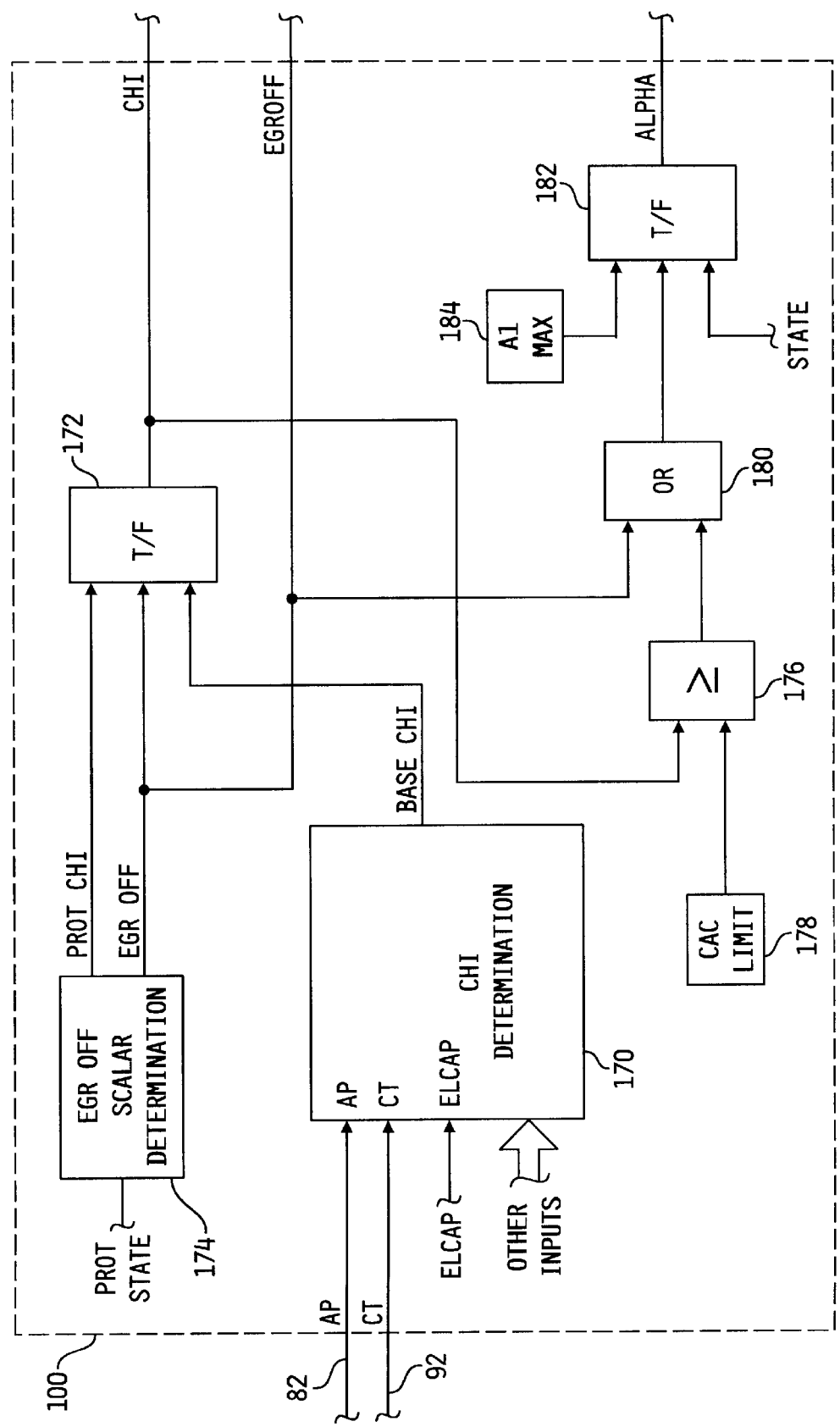
FIG. 6A is a diagrammatic illustration of one preferred embodiment of the control scalar determination block of FIG. 3, in accordance with the present invention.

Referring now to FIG. 6A, one preferred embodiment of the control scalar determination block 100 of FIG. 3, in accordance with the present invention, is shown. Block 100 includes a CHI determination block 170 having first and second inputs receiving the ambient pressure signal (AP) on signal path 82 and the coolant temperature signal (CT) on signal path 92. Block 170 also includes an emissions level cap input (ELCAP) receiving an internally generated emissions level cap command (ELCAP) corresponding to a maximum desired emissions level. In one preferred embodiment, the emissions level cap command ELCAP is a function of a number of engine operating conditions such as, for example, altitude, ambient temperature and/or engine speed, and may further be a function of any one or more auxiliary emission control devices (AECDs). Details relating to one embodiment of a system for generating ELCAP in this manner is disclosed in U.S. patent application Ser. No. 10/059,505, entitled SYSTEM FOR CONTROLLING EXHAUST EMISSIONS PRODUCED BY AN INTERNAL COMBUSTION ENGINE, the disclosure of which is incorporated herein by reference. Alternatively, ELCAP may be a dynamic value that changes in accordance with one or more operating conditions and/or processes executed by engine controller 58 in accordance with a desired control strategy, although the present invention contemplates that ELCAP may alternatively still be a static value that is stored within engine controller 58. In any case, the CHI determination block 170 includes a number of additional inputs receiving internally generated values (i.e., internal to engine controller 58), and the CHI determination block 170 is generally operable to produce a BASE CHI data structure as a function of its various inputs, as will be described in greater detail hereinafter with respect to FIGS. 7 and 8. In general, the BASE CHI data structure is preferably a function of engine speed and engine fueling, and represents SOI, charge flow and EGR fraction command values corresponding to a current desired emissions cap level (ELCAP) as well as either of a current air density value and/or current engine operating temperature.

Block 100 further includes a true/false block 172 having a first input receiving the base CHI data structure from the CHI determination block 170, a second input receiving an protective CHI data structure (PROT CHI) from an EGR OFF scalar determination block 174, and a third input receiving an EGR OFF permission value from block 174. In the embodiment shown, the EGR OFF scalar determination block receives a single input data structure PROT STATE, and is operable as will be described hereinafter with respect to FIG. 6B to produce the PROT CHI data structure and the EGR OFF value. In one preferred embodiment, the input data structure PROT STATE is a function of one or more auxiliary emission control devices (AECDs), and details relating to one embodiment of a system for generating PROT STATE in this manner is disclosed in U.S. patent application Ser. No. 10/059,505, entitled SYSTEM FOR CONTROLLING EXHAUST EMISSIONS PRODUCED BY AN INTERNAL COMBUSTION ENGINE, the disclosure of which has been incorporated herein by reference. Alternatively, PROT STATE may be a dynamic data structure that changes in accordance with one or more operating conditions and/or processes executed by engine controller 58 in accordance with a desired control strategy, although the present invention contemplates that PROT STATE may alternatively still be a static data structure that is stored within engine controller 58. In any case, the true/false block 172 is responsive to a "true" value of EGR OFF to produce as its output the PROT CHI data structure produced by block 174, and is otherwise operable to produce as its output the BASE CHI data structure produced by CHI determination block 120. The output of the true/false block 172 produces the CHI data structure (CHI) produced by the control scalar determination block 100.

Block 100 further includes an arithmetic operator block 176 having a first input receiving the CHI data structure from block 172 and a second input receiving a CHI ALPHA clamp (CAC) limit from block 178. Preferably, arithmetic operator block 176 corresponds to a "greater than or equal to" function such that the output of block 176 is "true" only if the CHI value of the CHI data structure produced by block 172 is greater than or equal to the CHI ALPHA clamp limit produced by block 178. The output of block 176 is provided to one input of an OR block 180 having a second input receiving the EGROFF value. The output of OR block 180 is provided as a first input to a true/false block 182 having a second input receiving an internally generated STATE value and a third input receiving a maximum ALPHA value (A1 MAX) from block 184. The output of true/false block 182 provides the ALPHA value produced by the control scalar determination block 100 of FIG. 3.

The internally generated STATE value corresponds to an operational state of engine 12 and is preferably a value between zero and one, with "zero" corresponding to a transient operating state and a "one" corresponding to steady state engine operation. The CHI ALPHA clamp limit (CAC limit) of block 128 corresponds to a CHI value above which it is desirable to set the ALPHA output of block 100 to the A1 MAX value of block 184 regardless of the operating state of engine 12. In accordance with the operation of blocks 176–184, if the CHI value produced by block 172 is greater than the CHI ALPHA clamp limit of block 178 or the EGR OFF value corresponds to permission to turn EGR off, block 100 produces as at the ALPHA output the A1 MAX value of block 184. On the other hand, if the CHI value produced by block 172 is less than the CHI ALPHA clamp limit produced by block 178 or the EGROFF value does not correspond to permission to turn EGR off (i.e., at least some EGR fraction will be commanded), the true/false block 182 is operable to produce the STATE value, corresponding to the operating state of engine 12) at the ALPHA output of block 100.

Figure 6B:
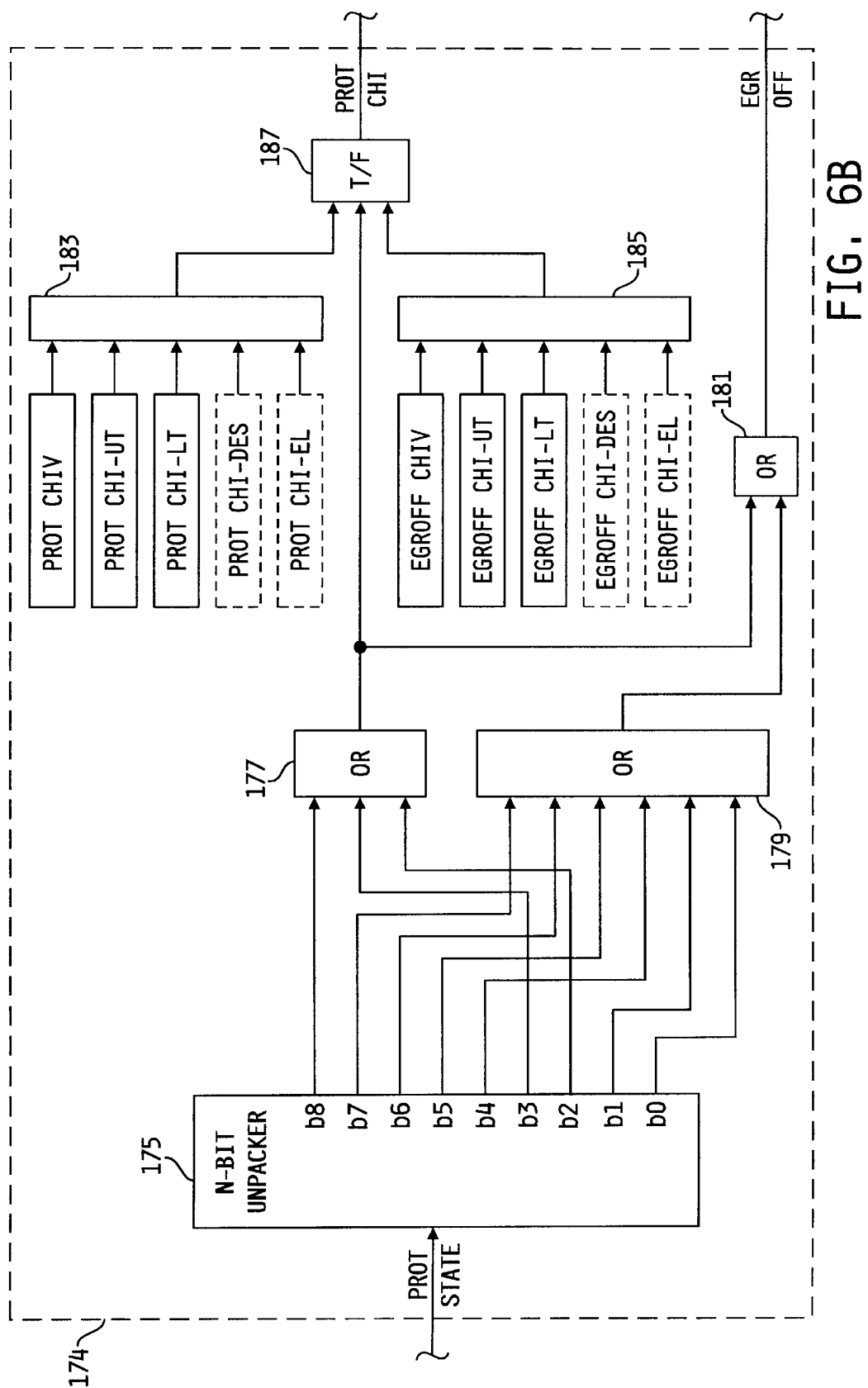
FIG. 6B is a diagrammatic illustration of one preferred embodiment of the EGR OFF scalar determination block of FIG. 6A, in accordance with the present invention.

Referring now to FIG. 6B, one preferred embodiment of the EGR OFF scalar determination block 174, in accordance with the present invention, is shown. Block 174 includes an N-bit unpacker block 175 operable to "un-pack" the PROT STATE data structure and thus provide as outputs thereof the individual bit values of the PROT STATE data structure. In the embodiment shown, block 175 is a 9-bit unpacker block, although the present invention contemplates that "N" may be any positive integer that will generally be dictated by the number of AECDs included within engine controller 58.

Various logical combinations of the bit values produced by N-bit unpacker block 175 may be used to define the EGR OFF value. In the embodiment illustrated in FIG. 6B, for example, bits b0, b1, and b4–b7 are provided as inputs to an OR block 179, and bits b2, b3 and b8 are provided as inputs to another OR block 177, wherein the outputs of OR blocks 177 and 179 are provided as inputs to a two-input OR block 181. The output of OR block 181 defines the EGR OFF value. Those skilled in the art will recognize that other logical combinations of the outputs of N-bit unpacker block 175 may be used to define the EGR OFF value, or that EGR OFF may alternatively be a static value stored within a memory of engine controller 58 as described hereinabove. In any case, the EGR OFF scalar determination block 174 illustrated in FIG. 6B further includes a true/false block 187 having a first input receiving the output signal produced by OR block 177, a second input receiving a "protective" CHI data structure via block 183 and a third input receiving an "EGROFF" CHI data structure via block 185. The output of true/false block 187 is the PROT CHI data structure described hereinabove with respect to FIG. 6A.

If the output of OR block 177 is "true", true/false block 187 will produce as its output the "protective" CHI data structure represented by PROT CHIV, PROT CHI-UT, PROT CHI-LT, and optionally PROT CHI-DES and/or PROT CHI-EL. If, on the other hand, the output of OR block 177 is "false", true/false block 187 will produce as its output the "EGROFF" CHI data structure represented by EGROFF CHIV, EGROFF CHI-UT, EGROFF CHI-LT, and optionally EGROFF CHI-DES and/or EGROFF CHI-EL. The purpose of each element of the foregoing CHI data structures (and of the BASE CHI data structure), including any optional elements, will be described in detail hereinafter with respect to FIGS. 7 and 8.

Although the output of OR block 177 is illustrated in FIG. 6B as being defined by the ORed combination of bits b2, b3 and b8 of the PROT CHI data structure, the present invention contemplates that other logical combinations of the outputs of N-bit unpacker block 175 may alternatively be used to define the control input of true/false block 187, or that this control value may alternatively be a static value stored within a memory of engine controller 58. In any case, a "false" output of OR block 177 corresponds to permission to turn off EGR (i.e., command zero EGR fraction), and the EGROFF CHI data structure provided by block 185 is accordingly configured to accomplish this strategy. A "true" output of OR block 177, on the other hand, corresponds to commanding some alternative EGR fraction consistent with the operation of the one or more AECDs wherein the PROT CHI data structure provided by block 183 is configured to accomplish such a strategy.

Figure 7:
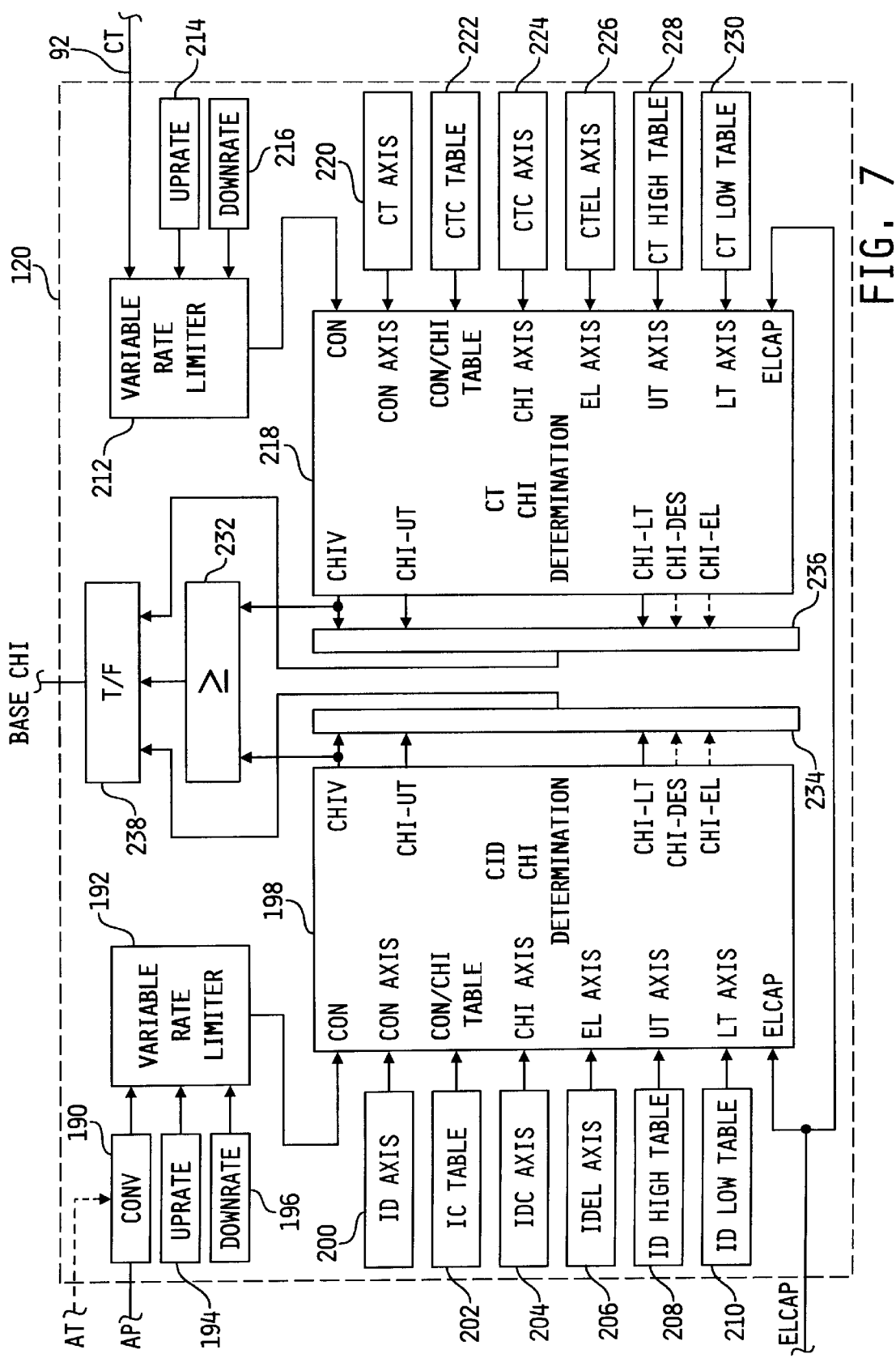
FIG. 7 is a diagrammatic illustration of one preferred embodiment of the chi determination block of FIG. 6, in accordance with the present invention.

Referring now to FIG. 7, one preferred embodiment of the CHI determination block 170 of FIG. 6, in accordance with the present invention, is shown. Block 170 includes a data conversion block 190 receiving the ambient pressure signal (AP) and producing an air density value at an output thereof in accordance with well-known equations relating ambient air pressure to ambient air density. Optionally, as shown in phantom in FIG. 7, conversion block 190 may further include an input receiving the ambient temperature signal (AT), wherein block 190 is operable to produce a more accurate air density value as a function of ambient air pressure (AP) and ambient air temperature (AT) in accordance with well-known equations. In either case, the output of the data conversion block 190 is provided as a first input to a variable rate limiter 192 having a second input receiving an UPRATE value from block 194 and a third input receiving a DOWNRATE value from block 196. The output of the variable rate limiter 192 is provided to a condition input (CON) of a compressor inlet density (CID) CHI determination block 198. Limiter 192 is operable, as is known in the art, to limit the rate of increase of the output signal provided to block 198 based on the UPRATE value, and to limit the rate of decrease of the output signal provided to block 198 based on the DOWNRATE value.

Block 198 includes a number of additional inputs specifying table (or other data structure) axes break points and/or table row/column identifiers. For example, block 198 includes a condition axis (CON AXIS) receiving an inlet density (ID) axis value from block 200, a condition-to-chi table input (CON/CHI table) receiving an inlet CHI (IC) table value from block 202. A CHI axis input (CHI AXIS) of block 198 receives an inlet density CHI (IDC) axis value from block 204 and an emissions level axis input (EL AXIS) of block 198 receives an inlet density emissions level (IDEL) axis value from block 206. An upper table axis input (UT AXIS) of block 198 receives an inlet density (ID) high table value from block 208, and a lower table axis input (LT AXIS) of block 198 receives an inlet density (ID) low table value from block 210. Block 198 further includes an emissions level cap input (ELCAP) receiving the ELCAP value described hereinabove with reference to FIG. 6. The compressor inlet density CHI determination block 198 is operable, as will be described in greater detail with respect to FIG. 8, to produce a CHI data structure including a CHI value as well as CHI upper and lower table values at outputs CHIV, CHI-UT and CHI-LT respectively, and may be configured to optionally produce an emissions level CHI value CHI-EL and/or a desired CHI value CHI-DES. The CHI value (CHIV) and the CHI upper and lower table values (CHI-UT and CHI-LT), and optionally the CHI-EL and/or CHI-DES values, correspond to the CHI data structure described hereinabove with respect to FIGS. 3 and 6, and are transferred to a first input of a true/false block 238 via a data funneling block 234. Additionally, the CHI value (CHIV) produced by block 198 is provided to one input of an arithmetic operator block 232.

Block 170 also includes a second variable rate limiter 212 having a first input receiving the coolant temperature signal (CT), a second input receiving an UPRATE value from block 214 and a third input receiving a DOWNRATE value from block 216. An output of the variable rate limiter 212 is provided to a condition input (CON) of a coolant temperature (CT) CHI determination block 218. Limiter 212 is operable, as is known in the art, to limit the rate of increase of the output signal provided to block 218 based on the UPRATE value, and to limit the rate of decrease of the output signal provided to block 218 based on the DOWNRATE value. Block 218 is preferably identical to block 198 and therefore includes a number of inputs receiving axes breakpoints and/or table row/column values from blocks 220–230 analogous to blocks 200–210 described with respect to block 198. As with block 198, block 218 also receives the emissions level cap value (ELCAP) at an emissions level cap input (ELCAP) thereof. The coolant temperature CHI determination block 218 is identical in operation to the compressor inlet density CHI determination block 198, and thus produces a CHI value as well as CHI upper and lower table values at outputs CHIV, CHI-UT and CHI-LT respectively, and may be configured to optionally produce an emissions level CHI value CHI-EL and/or a desired CHI value CHI-DES. The CHI data structure defined by these outputs are provided to a second input of true/false block 238 by data funneling block 236, and the CHI value produced at the CHIV output of block 218 is provided to a second input of arithmetic operator block 232 having an output provided to a third input of true/false block 238. The output of true/false block 238 produces the base CHI data structure provided by the CHI determination block 170.

In the operation of block 170, the compressor inlet density CHI determination block 198 is responsive to the air density value provided thereto by the variable rate limiter 192 to produce a first CHI data structure based on the table and table axis inputs thereto and further based on the ELCAP value. The coolant temperature CHI determination block 218 is likewise responsive to the coolant temperature value provided thereto by the variable rate limiter 212 to produce a second CHI data structure based on the table and table axis inputs thereto and further based on the ELCAP value. Arithmetic operator block 232 is preferably configured as a "greater than or equal to" function such that its output is "true" if the CHI value produced by the compressor inlet density CHI determination block 198 is greater than or equal to the CHI value produced by the coolant temperature CHI determination block 218. In this case, true/false block 238 produces as the base CHI data structure the CHI data structure produced by the compressor inlet density CHI determination block 198; i.e., CHIV, CHI-UT and CHI-LT (and optionally CHI-EL and/or CHI-DES) of block 198. Otherwise, if the CHI value produced by the coolant temperature CHI determination block 218 is greater than the CHI value produced by the compressor inlet density CHI determination block 198, the true/false block 238 is operable to produce as the base CHI data structure the CHI data structure produced by the coolant temperature CHI determination block 218; namely CHIV, CHI-UT and CHI-LT (and optionally CHI-EL and/or CHI-DES) of block 218. It should be apparent from the foregoing that the embodiment of block 120 illustrated in FIG. 7 is configured to select as the base CHI data structure the CHI data structure of blocks 198 and 218 having the highest CHI value. Alternatively, block 120 may be configured to select between CHI data structures based on any desired criteria. For example, block 120 may be configured to prefer either the compressor inlet density CHI data structure or the coolant temperature CHI data structure under certain engine operating conditions such as wherein a corresponding one of the engine operating parameters (e.g., ambient air density or engine temperature) dominates current engine operating conditions and/or is more of a concern under certain engine operating conditions or environments. In any case, it is to be understood that such alternate embodiments of block 120 are intended to fall within the scope of the present invention.

Figure 8:
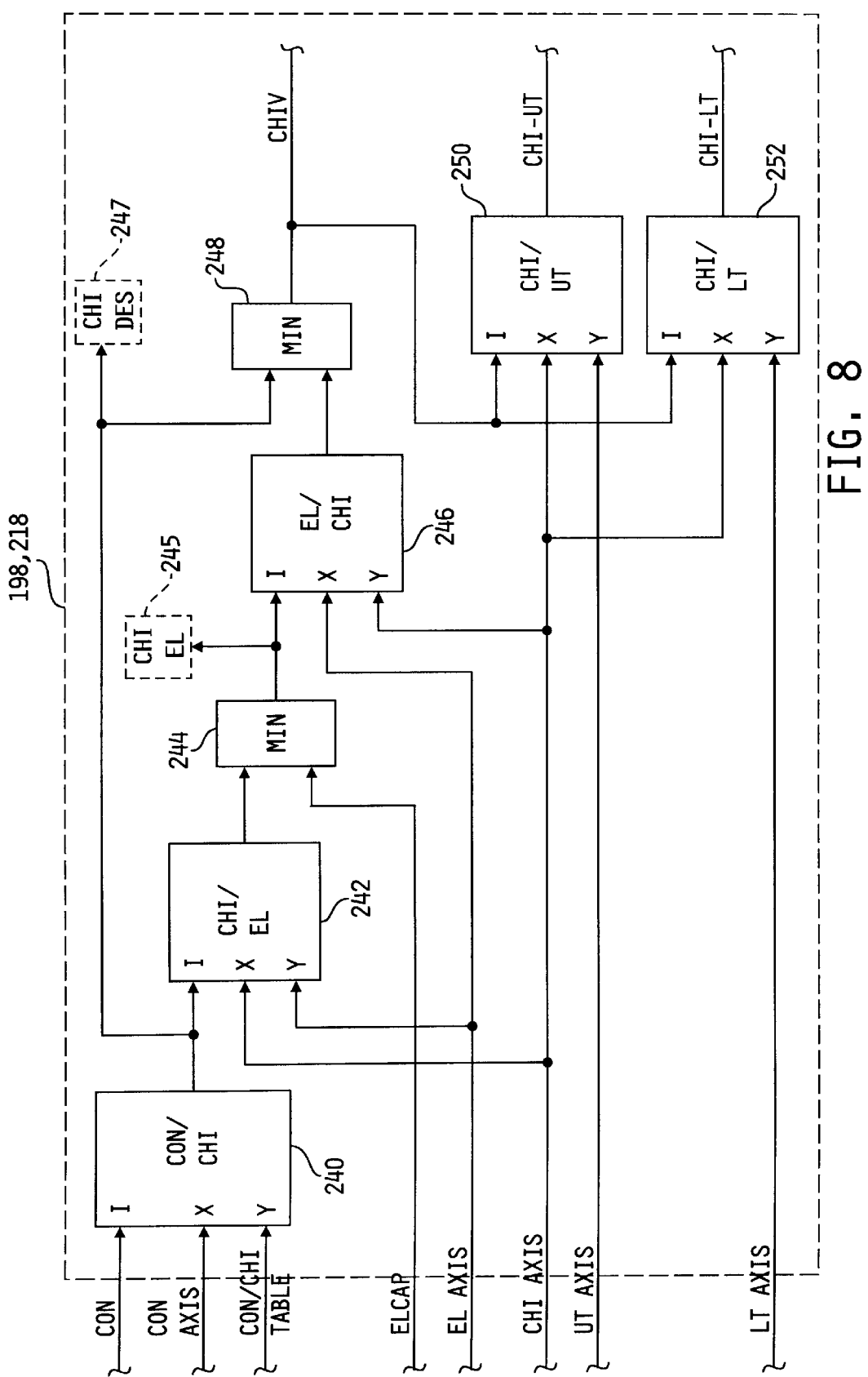
FIG. 8 is a diagrammatic illustration of one preferred embodiment of either of the CID or CT chi determination blocks of FIG. 7, in accordance with the present invention.

Referring now to FIG. 8, one preferred embodiment of either of the CHI determination blocks 198 and 218 of FIG. 7, in accordance with the present invention, is shown. Block 198/218 includes a condition-to-chi (CON/CHI) block 240 having a data input (I) corresponding to the condition input (CON) of blocks 198/218, an X axis input (X) corresponding to the condition axis input (CON AXIS) input of blocks 198/218 and a Y axis input (Y) corresponding to the condition-to-chi table input (CON/CHI table) of blocks 198/218. The output of block 240 is provided to a data input (IN) of a chi-to-emissions level block (CHI/EL) 242 having an X axis input (X) corresponding to the CHI axis input of blocks 198/218 and a Y axis input (Y) corresponding to the emissions level axis (EL AXIS) of blocks 198/218. The output of CON/CHI block 240 further defines the optional desired CHI value CHI-DES as illustrated by dashed-line block 247, wherein CHI-DES may be used for diagnostic or other purposes.

The output of CHI/EL block 242 is provided to a first input of a MIN block 244 having a second input corresponding to the emissions level cap input (ELCAP) of blocks 198/218. The output of block 242 further defines the optional emissions level CHI value CHI-EL as illustrated by dashed-line block 245, wherein CHI-EL may be used for diagnostic or other purposes. An output of MIN block 244 is provided to a data input (I) of an emissions level-to-chi block (EL/CHI) having an X axis input (X) corresponding to the emissions level axis input (EL AXIS) of blocks 198/218 and a Y axis input (Y) corresponding to the CHI axis input of blocks 198/218. The output of block 246 is provided to one input of a MIN block 248 having a second input receiving the output of block 240. An output of block 248 produces the CHI value at the CHIV output of blocks 198/218.

The output of MIN block 248 is also provided to data inputs (I) of a chi-to-upper table block (CHI/UT) 250 and a chi-to-lower table block (CHI/LT) 252. The X-axis inputs (X) of blocks 250 and 252 correspond to the CHI axis input of blocks 198/218, and the Y-axis input (Y) of block 250 corresponds to the upper table axis input (UT AXIS) of blocks 198/218. The Y-axis input of block 252 corresponds to the lower table axis input (LT AXIS) of blocks 198/218. The output of block 250 corresponds to the CHI upper table value (CHI-UT) and the output of block 252 corresponds to the CHI lower table value (CHI-LT) each produced by blocks 198/218 as part of the CHI data structure.

Preferably, each of the blocks 240, 242, 246, 250 and 252 represent linear interpretation tables of known construction. The CON/CHI table 240 is operable to convert the condition input (e.g., ambient air density or engine coolant temperature) to an initial CHI value, and the CHI/EL table is operable to convert the CHI value produced by table 240 to a corresponding emissions level value. MIN block 244 is operable to compare the emissions level value produced by block 242 with the desired (or required) emissions level cap value ELCAP. Under conditions wherein the emissions level resulting from the CHI value computed by block 242 is less than or equal to the predefined emissions level cap value ELCAP, block 198/218 is operable to select the CHI value produced by table 240 as the CHI value CHIV produced by block 198/218. If, however, the predefined emissions level cap value ELCAP is less than the emissions level resulting from the CHI value computed by block 242, the CHI value produced by the EL/CHI conversion table is compared with the CHI value produced by table 240 and the minimum thereof is selected as the CHI value CHIV produced by block 198/218. Thus, the embodiment of block 198/218 illustrated in FIG. 8 provides for the ability to "override" the CHI value computed based on current ambient air density and/or engine temperature conditions, and to provide a CHI value that will ultimately result in an emissions level produced by engine 12 that is less than or equal to the emissions level cap value ELCAP. In either case, the upper and lower CHI table axes values (CHI-UT and CHI-LT respectively) are produced by the CHI-to-upper table (CHI/UT) and CHI-to-lower table (CHI/LT) conversion tables 250 and 252 respectively as a function of the final CHI value (CHIV).

Figure 9:
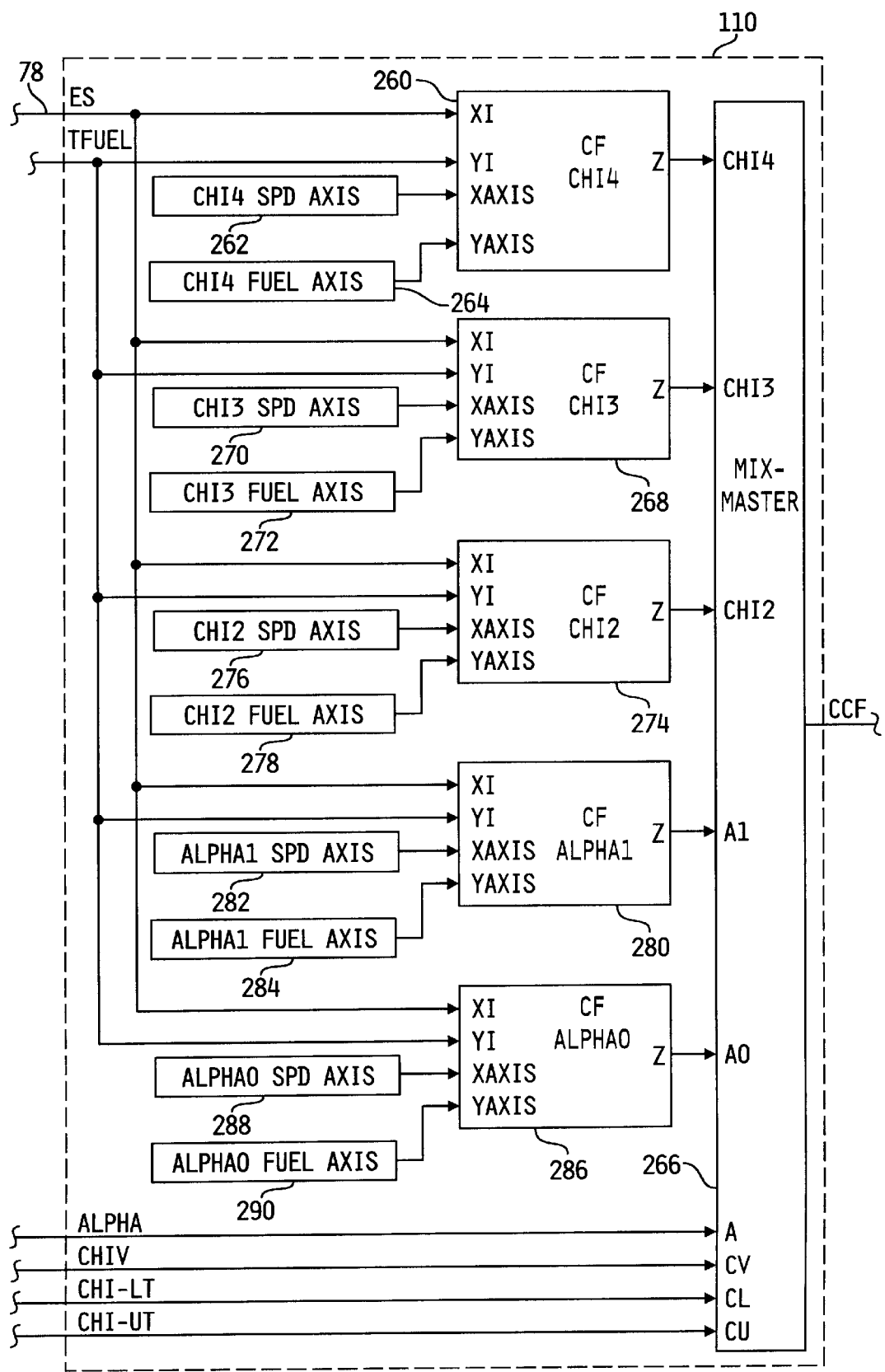
FIG. 9 is a diagrammatic illustration of one preferred embodiment of the charge flow reference determination block of FIG. 3, in accordance with the present invention.

Referring now to FIG. 9, one preferred embodiment of the charge flow reference determination block 110 of FIG. 3, in accordance with the present invention, is shown. Block 110 includes a charge flow (CF) CHI4 table 260 having a first data input (XI) receiving the engine speed signal (ES) on signal path 78 and a second data input (YI) receiving the torque fuel value (TFUEL) from the fuel quantity reference determination block 102. X-axis and Y-axis inputs of block 260 receive CHI4 speed axis and CHI4 fuel axis values from blocks 262 and 264 respectively. An output (Z) of block 260 is provided to a CHI4 input of a mix-master block 266. Block 110 includes a number of additional charge flow CHI blocks 268 and 274 all connected and configured identically to that described with respect to block 260 and receiving appropriate speed and fuel axes values from blocks 270–278. Z outputs of blocks 268 and 274 are provided to CHI3 and CHI2 inputs respectively of the mix-master block 266. Block 110 further includes two charge flow ALPHA blocks 280 and 266 connected and configured identically to the charge flow CHI blocks 260, 268 and 274 and receiving appropriate speed axis and fuel axis values from blocks 282–290 respectively. The Z output of the charge flow ALPHA1 block 280 is provided to an A1 input, and the Z output of the charge flow ALPHA0 block 282 is provided to an A0 input, of the mix-master block 266. The mix-master block 266 further includes a number of inputs receiving the CHI data structure (CHI-V, CHI-LT and CHI-UT) as well as the ALPHA value produced by the control scalar determination block 100. The output of the mix-master block 266 corresponds to the output of the charge flow reference determination block 110, and provides the commanded charge flow value (CCF) produced by the combustion manager 60 (FIG. 2).

Figure 10:
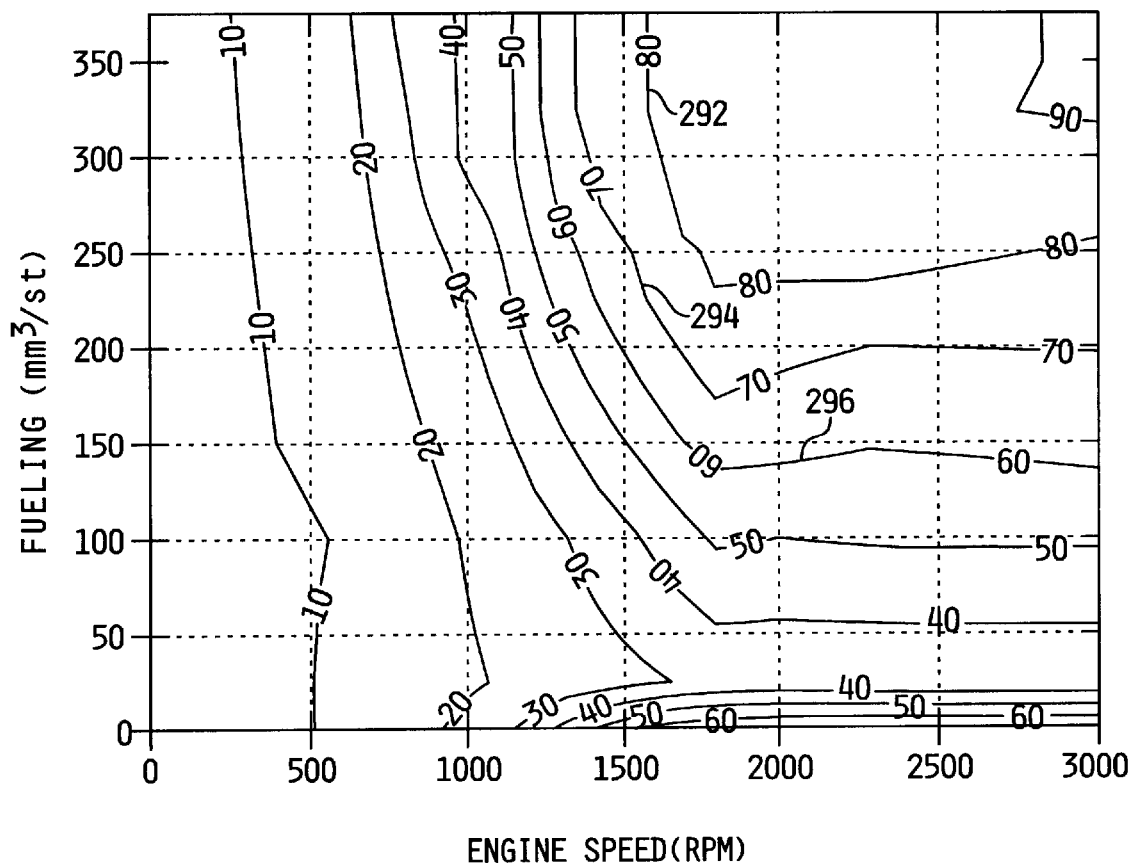
FIG. 10 is a graphic representation of one preferred embodiment of any of the charge flow chi or alpha blocks of FIG. 9, in accordance with the present invention.

Referring now to FIG. 10, one preferred embodiment of a plot of a number of charge flow contours vs. engine speed (RPM) and engine fueling (mm$^3$/stroke) is shown, wherein the plot represents an example of any of the charge flow CHI or ALPHA blocks 260, 268, 274, 280 or 286 of FIG. 9. The specific charge flow contours; e.g., contours 292, 294 and 296, represent lines of constant charge flow in units of lbm/min or kg/s, and any of blocks 260, 268, 274, 280 or 286 are preferably operable to select an appropriate contour, or to interpolate between appropriate contours using known techniques, based on current engine speed and fueling conditions. It is to be understood that the particular charge flow contour plot illustrated in FIG. 10 is shown only by way of example, and that the present invention contemplates that the charge flow contour plot for any of the charge flow CHI and/or ALPHA blocks 260, 268, 274, 280 or 286 may alternatively take on different shapes and/or functions. Moreover, although blocks 260, 268, 274, 280 or 286 are illustrated in FIG. 10 as a graphical representations, the present invention contemplates implementing any of blocks 260, 268, 274, 280 and 286 as one or more tables, equations, or the like.

Figure 11:
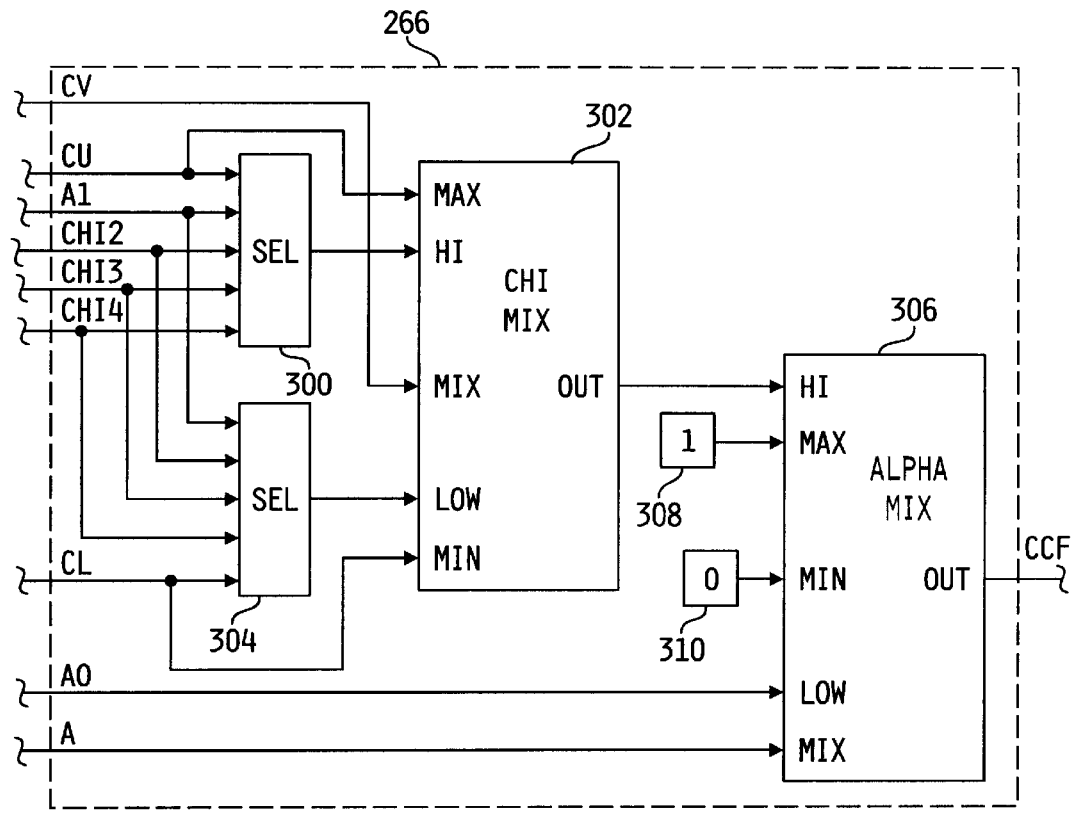
FIG. 11 is a diagrammatic illustration of one preferred embodiment of the mix-master block of FIG. 9, in accordance with the present invention.

Referring now to FIG. 11, one preferred embodiment of the mix-master block 266 of the charge flow reference determination block 110 of FIG. 9, in accordance with the present invention, is shown. Mix-master block 266 includes a high selection block 300 and a low selection block 304 each having a first input receiving the ALPHA1 value from block 280 at input A1 of block 266, a second input receiving the CHI2 value from block 274 at input CHI2 of block 266, a third input receiving the CHI3 value from block 268 at input CHI3 of block 266 and a fourth input receiving the CHI4 value from block 260 at input CHI4 of block 266. Additionally, high selection block 300 has a fifth input receiving the upper table CHI value (CHI-UT) at input CU of block 266, and low selection block 304 has a fifth input receiving the lower table CHI value (CHI-LT) at input CL of block 266. An output of the high selection block 300 is provided to a HI input of a CHI MIX block 302, and an output of the low selection block 304 is provided to a LOW input of CHI MIX block 302. CHI MIX block 302 further includes a MAX input receiving the upper table CHI value (CHI-UT) and a MIN input receiving the lower table CHI value (CHI-LT). A MIX input of CHI MIX block 302 receives the actual CHI value (CHIV) provided to the CV input of the mix-master block 266.

An output (OUT) of CHI MIX block 302 is provided to a HI input of an ALPHA MIX block 306 having a LOW input receiving the ALPHA0 value from block 286 at input A0 of the mix-master block 266. ALPHA MIX block 306 further includes a MAX input that preferably receives a fixed "1" value from block 308, and a MIN input that preferably receives a fixed "0" value from block 310. A MIX input of ALPHA MIX block 306 receives the actual ALPHA value provided to the "A" input of the mix-master block 266. An output of the ALPHA MIX block 306 defines the output of the charge flow reference determination block 110, and hence provides the commanded charge flow value (CCF).

In the embodiment illustrated in FIGS. 9–11, the upper and lower table CHI values are each preferably bounded between 1 and 4, and may take on integer values between and including the boundary values. The high selection block is preferably responsive to the upper table CHI value to select an appropriate one of the remaining inputs thereof as its output, and the low selection block is likewise preferably responsive to the lower table CHI value to select an appropriate one of the remaining inputs thereof as its output. For example, if the upper table CHI value (CHI-UT) corresponds to 3 and the lower table CHI value (CHI-LT) corresponds to 2, the output of the high selection block 300 is the charge flow value produced by the charge flow CHI3 block 268 of FIG. 9 and the output of the low selection block 304 is the charge flow value produced by the charge flow CHI2 block 274 of FIG. 9. The CHI MIX block 302 is operable, as will be described in greater detail hereinafter, to produce a charge flow value that is between those produced by the high and low selection blocks 300 and 304 respectively, and that is further a function of the actual CHI value (CHIV). The ALPHA MIX block 306 is, in one embodiment, identical to the CHI MIX block 302 and is likewise operable, as will be described in greater detail hereinafter, to produce the final commanded charge flow value (CCF) that is between the charge flow value produced by CHI MIX block 302 and the charge flow value produced by the charge flow ALPHA0 block 286, and that is a further function of the actual ALPHA value produced by the control scalar determination block 100.

Figure 12:
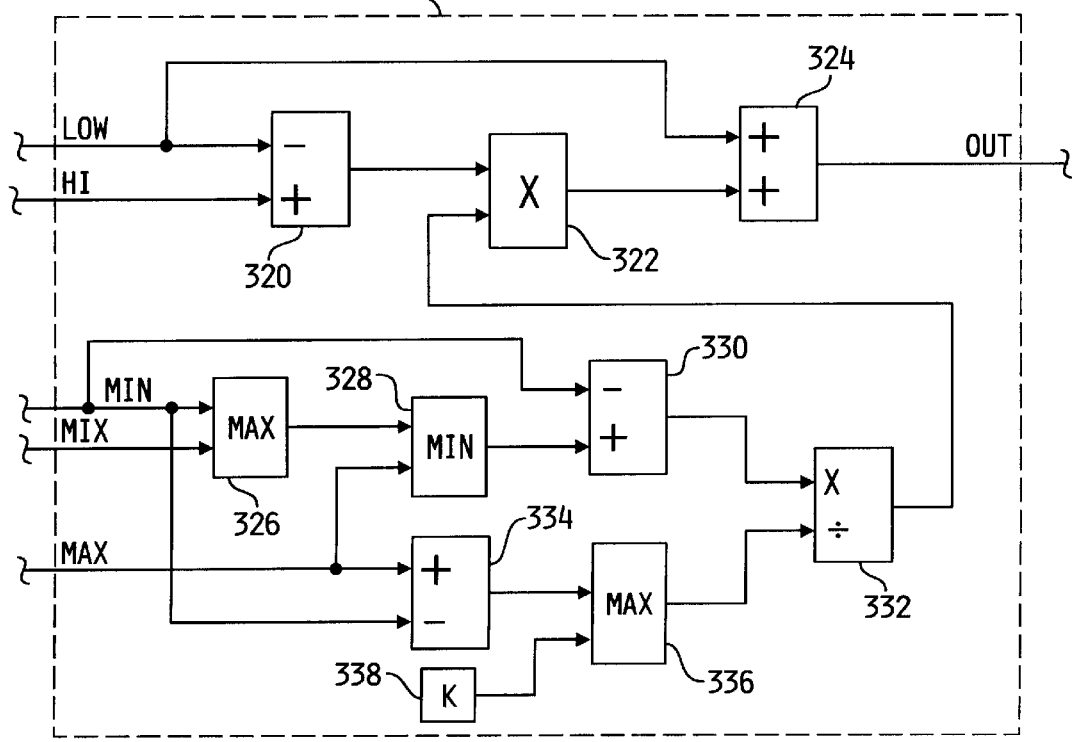
FIG. 12 is a diagrammatic illustration of one preferred embodiment of either of the chi and alpha mix blocks of FIG. 11, in accordance with the present invention.

Referring now to FIG. 12, one preferred embodiment of either of the CHI MIX or ALPHA MIX blocks 302 and 306, in accordance with the present invention, is shown. Block 302, 306 includes a first arithmetic block 320 having an addition input connected to the HI input and a subtraction input connected to the LOW input of block 302, 306. An output of block 320 is connected to one input of a multiplication block having an output connected to a first addition input of a summation block 324. A second addition input of block 324 is connected to the subtraction input of block 320, and an output of summation block 324 defines the output (OUT) of block 302, 306.

Block 302, 306 further includes a MAX block 326 having a first input connected to the MIX input of block 302, 306 and a second input connected to the MIN input of block 302, 306. An output of MAX block 326 is connected to a first input of a MIN block 328 having a second input connected to the MAX input of block 302, 306. An output of MIN block 328 is connected to an addition input of an arithmetic block 330, and a subtraction input of block 330 is connected to the MIN input of block 302, 306. The output of arithmetic block 330 is connected to a multiplication input of an arithmetic block 332 having a division input connected to an output of a MAX block 336. The output of block 332 is connected to a second input of multiplication block 322. One input of MAX block 336 receives a non-zero constant value "K" from block 338, and a second input of MAX block 336 is connected to the output of an arithmetic block 334 having an addition input connected to the MAX input of block 302, 306 and a subtraction input connected to the MIN input of block 302, 306. The MAX block 336 and constant block 338 establish a fixed constant to avoid dividing by zero in block 332.

In operation, the implementation of block 302, 306 illustrated in FIG. 12 is operable to produce a charge flow output by establishing the charge flow value received at the LOW input as a base charge flow value, and then upwardly adjusting this value based on a difference between the charge flow values received at the HI and LOW inputs multiplied by a function of the MIX value. Continuing with the example provided above with respect to FIG. 11, if the upper table CHI value (CHI-UT) is 3 and the lower table CHI value (CHI-LT) is 2, the MAX input of CHI MIX block 302 is 3, the HI input is the charge flow value produced by the charge flow CHI3 block 268 (hereinafter "CHI3"), the LOW input is the charge flow value produced by the charge flow CHI2 block 274 (hereinafter "CHI2") and the MIN input of CHI MIX block 302 is 2. If the actual CHI value (CHIV) is, for example, 2.2, the charge flow output of the CHI MIX block 302 is given by the equation $OUT_{302}=CHI2+0.2*(CHI3-CHI2)$, and therefore represents an intermediate charge flow value between that produced by the charge flow CHI2 block 274 and the charge flow CHI3 block 268. This output signal of block 302 becomes the HI input of ALPHA MIX block 306, wherein the MAX input is fixed at "1", the MIN input is fixed at "0" and the LOW input is equal to the charge flow value produced by the charge flow ALPHA0 block 286 (hereinafter "A0"). The MIX input of ALPHA MIX block 306 is equal to the ALPHA value produced by the control scalar determination block 100 of FIG. 3, and is dependent upon the chi value (CHIV), the on/off state of EGR flow and/or the operational state of engine 12 (STATE). Under typical operating conditions, the charge flow output of the ALPHA MIX block 306, and hence the commanded charge flow value (CCF) produced by the combustion manager block 60, is given by the equation $CCF=A0+ALPHA*(OUT_{302}-A0)$, wherein ALPHA typically ranges between zero and one.

Figure 13A:
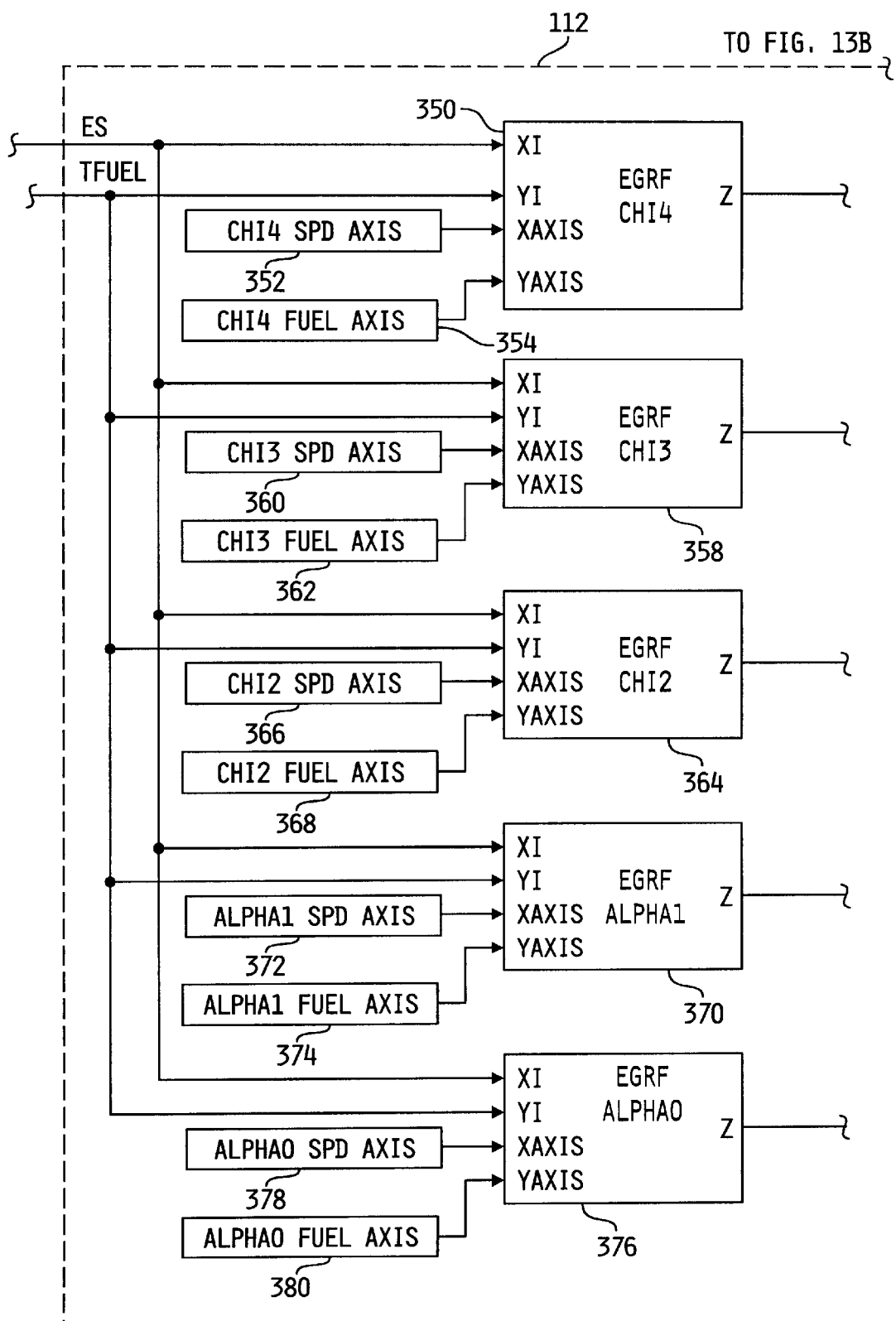
FIGS. 13A and 13B are a diagrammatic illustration of one preferred embodiment of the EGR fraction reference determination block of FIG. 3, in accordance with the present invention.
Figure 13B:
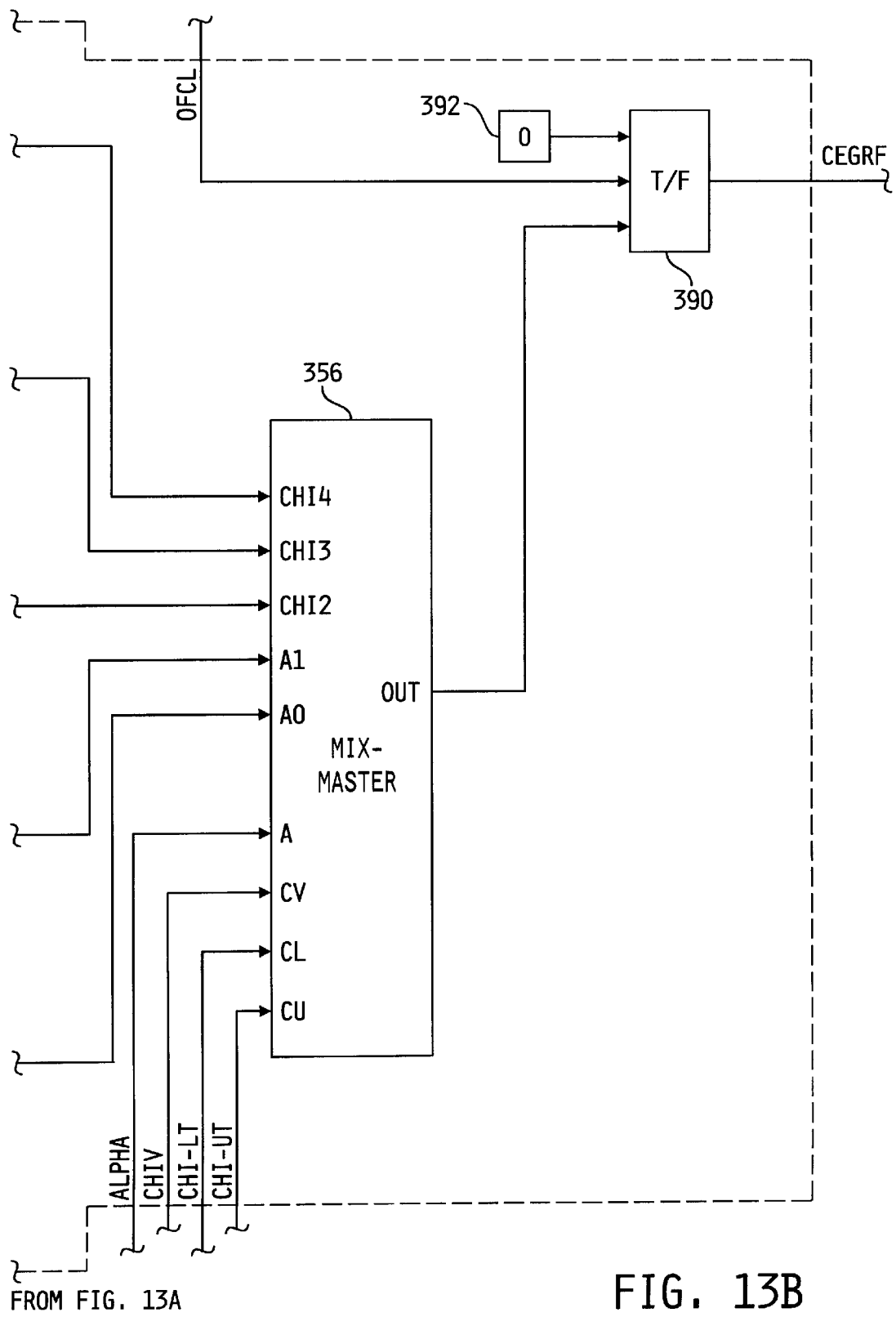

Referring now to FIGS. 13A and 13B, one preferred embodiment of the EGR fraction reference determination block 112 of FIG. 3, in accordance with the present invention, is shown. Block 112 is identical in many structural and functional respects to the charge flow reference determination block 110 illustrated in FIG. 9, and at least some of the description thereof will accordingly be omitted here for brevity. In any case, block 112 includes an EGR fraction (EGRF) CHI4 table 350 having a first data input (XI) receiving the engine speed signal (ES) on signal path 78 and a second data input (YI) receiving the torque fuel value (TFUEL) from the fuel quantity reference determination block 102. X-axis and Y-axis inputs of block 350 receive CHI4 speed axis and CHI4 fuel axis values from blocks 352 and 354 respectively. An output (Z) of block 350 is provided to a CHI4 input of a mix-master block 356, wherein mix-master block 356 is preferably identical to mix-master block 266 illustrated and described with respect to FIGS. 9 and 11–12.

Block 112 includes a number of additional EGR fraction CHI blocks 358 and 364 all connected and configured identically to that described with respect to block 350 and receiving appropriate speed and fuel axes values from blocks 360–368. Z outputs of blocks 358 and 364 are provided to CHI3 and CHI2 inputs respectively of the mix-master block 356. Block 112 further includes two EGR fraction ALPHA blocks 370 and 376 connected and configured identically to the EGR fraction CHI blocks 350, 358 and 364 and receiving appropriate speed axis and fuel axis values from blocks 372–380 respectively. The Z output of the EGR fraction ALPHA1 block 370 is provided to an A1 input, and the Z output of the EGR fraction ALPHA0 block 376 is provided to an A0 input, of the mix-master block 356. The mix-master block 356 further includes a number of inputs receiving the CHI data structure (CHI-V, CHI-LT and CHI-UT) as well as the ALPHA value produced by the control scalar determination block 100.

The output (OUT) of the mix-master block 356 is provided to one input of a true/false block 390 having a second input preferably receiving a fixed "0" value from block 392 and a third input receiving the OFCL input produced by the fuel quantity reference determination block 102 (see FIG. 3). The output of true/false block 390 corresponds to the output of the EGR fraction reference determination block 112, and provides the commanded EGR fraction value (CEGRF) produced by the combustion manager 60 (FIG. 2).

Figure 14:
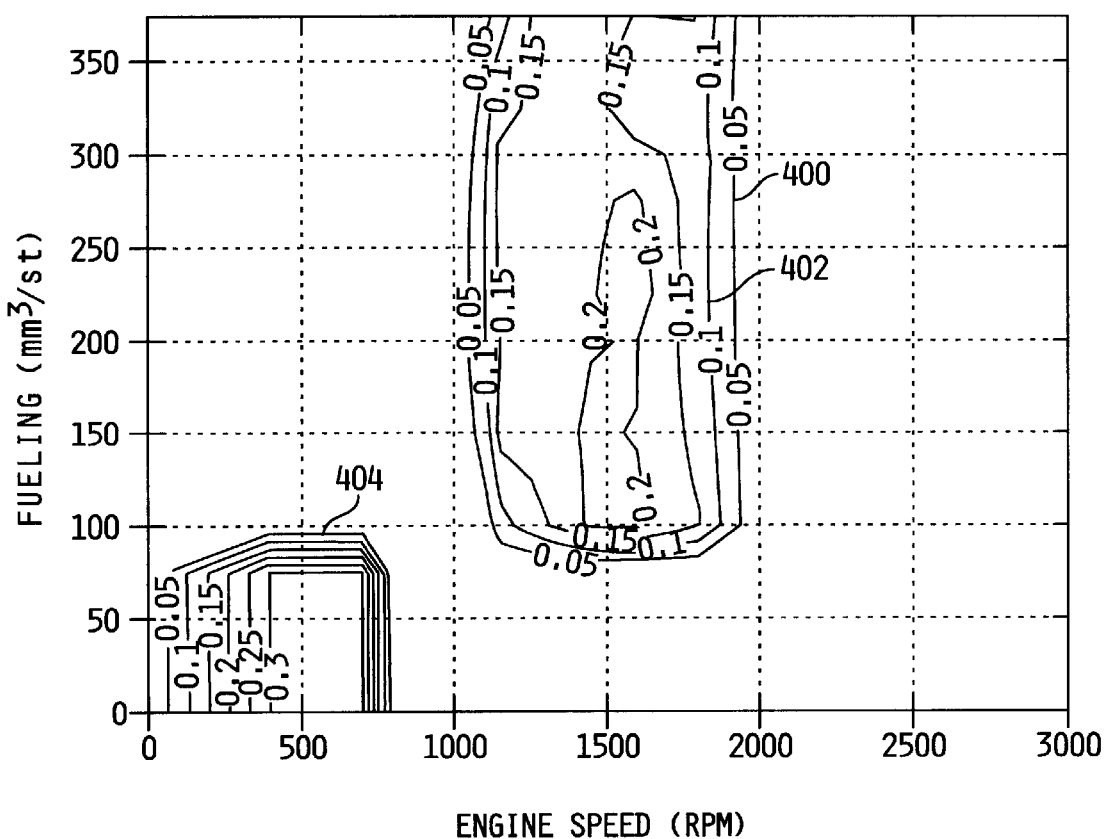
FIG. 14 is a graphic representation of one preferred embodiment of any of the EGR fraction chi or alpha blocks of FIG. 13A, in accordance with the present invention.

Referring now to FIG. 14, one preferred embodiment of a plot of a number of EGR fraction contours vs. engine speed (RPM) and engine fueling (mm$^3$/stroke) is shown, wherein the plot represents an example of any of the EGR fraction CHI or ALPHA blocks 350, 358, 364, 370 or 376 of FIG. 13A. The specific EGR fraction contours; e.g., contours 400, 402 and 404, represent lines of constant EGR fraction, and any of blocks 350, 358, 364, 370 or 376 are preferably operable to select an appropriate contour, or to interpolate between appropriate contours using known techniques, based on current engine speed and fueling conditions. It is to be understood that the particular EGR fraction contour plot illustrated in FIG. 14 is shown only by way of example, and that the present invention contemplates that the EGR fraction contour plot for any of the EGR fraction CHI and/or ALPHA blocks 350, 358, 364, 370 or 376 may alternatively take on different shapes and/or functions. Moreover, although blocks 350, 358, 364, 370 or 376 are illustrated in FIG. 14 as a graphical representations, the present invention contemplates implementing any of blocks 350, 358, 364, 370 and 376 as one or more tables, equations, or the like.

As described hereinabove, the mix-master block 356 of FIG. 13B is preferably configured identically to that illustrated and described with respect to FIGS. 11 and 12. The EGR fraction value emerging from the output (OUT) of block 356 is provided to a "false" input of true/false block 390 having a control input receiving the OFCL value produced by the fuel quantity reference determination block 102 (FIG. 3) and a "true" input receiving the zero value of block 392. Regardless of the commanded EGR value produced by mix-master block 356, if the OFCL value produced by the fuel quantity reference determination block 102 is "true", indicating that engine fueling is currently OFC limited as described hereinabove, true/false block 390 is operable to produce as its output the zero value of block 32, and the commanded EGR fraction value produced by block 112 (CEGRF) will likewise be zero. If, however, the OFCL value produced by the fuel quantity reference determination block 102 is "false", indicating that engine fueling is not currently OFC limited, true/false block 390 is operable to produce as its output the EGR fraction value produced by the mix-master block 356.

In one embodiment of the present invention, the SOI reference determination block 108 is preferably identical in structure and function to the charge flow reference determination block 110 illustrated and described with respect to FIGS. 9–12 with two minor exceptions. First, the SOI reference determination block 108 preferably based SOI determinations on the fuel reference value FUELREF rather than on the torque fuel value TFUEL. Secondly, the charge flow CHI and ALPHA blocks of FIG. 9 are replaced in the SOI reference determination block 108 with corresponding SOI CHI and ALPHA blocks, wherein such blocks are preferably configured in like manner to either of the plots shown in FIG. 10 or FIG. 14. In any case, the various SOI CHI and ALPHA blocks are preferably configured to produce corresponding SOI values as functions of engine speed and engine fueling (FUELREF).

While the invention has been illustrated and described in detail in the foregoing drawings and description, the same is to be considered as illustrative and not restrictive in character, it being understood that only preferred embodiments thereof have been shown and described and that all changes and modifications that come within the spirit of the invention are desired to be protected.

What is claimed is:

1. A system for generating a charge flow command and an EGR fraction command for an air handling system of an internal combustion engine, the system comprising:

means for determining engine rotational speed;

a memory unit having a number of charge flow data sets and corresponding EGR fraction data sets stored therein, each of said number of charge flow data sets producing a different charge flow command value and each of said number of EGR fraction data sets producing a different EGR fraction command value as a function of said engine rotational speed and an engine fueling command;

means for determining ambient air density;

means for determining engine operating temperature;

data subset selection logic selecting a subset of said number of charge flow and corresponding EGR fraction data sets as a function of an emission level cap value and of either of said ambient air density and said engine operating temperature;

charge flow determination logic producing the charge flow command from said subset of said number of charge flow data sets as a function of said engine rotational speed and said engine fueling command; and EGR fraction determination logic producing the EGR fraction command from said subset of said number of EGR fraction data sets as a function of said engine rotational speed and said engine fueling command.

2. The system of claim 1 wherein said data subset selection logic includes:

ambient air data set determination logic producing a first subset of said number of charge flow and corresponding EGR fraction data sets and a first optimum data subset value having a value between selected adjacent ones of said number of charge flow and corresponding EGR fraction data sets forming said first subset, as a function of said emissions level cap value and of said ambient air density;

engine operating temperature data set determination logic producing a second subset of said number of charge flow and corresponding EGR fraction data sets and a second optimum data subset value having a value between selected adjacent ones of said number of charge flow and corresponding EGR fraction data sets forming said second subset, as a function of said emissions level cap value and of said engine operating temperature; and comparison logic producing an optimum data subset value and said subset of said number of charge flow and corresponding EGR fraction data sets, said optimum data subset value corresponding to said first optimum data subset value and said subset corresponding to said first subset if said first optimum data subset value is greater than said second optimum data subset value, said optimum data subset value otherwise corresponding to said second data subset value and said subset corresponding to said second subset.

3. The system of claim 2 wherein said charge flow determination logic includes:

first mixing logic producing a first charge flow command value by interpolating between said selected adjacent ones of said subset of said number of charge flow data sets as a function of said optimum data subset value; and second mixing logic producing the charge flow command by interpolating between the first charge flow command value and a charge flow command value produced by a predetermined one of the number of charge flow data sets, as a function of a control value produced by said data subset selection logic.

4. The system of claim 2 wherein said EGR fraction determination logic includes:

first mixing logic producing a first EGR fraction command value by interpolating between said selected adjacent ones of said subset of said number of EGR fraction data sets as a function of said optimum data subset value; and second mixing logic producing the EGR fraction command by interpolating between the first EGR fraction command value and an EGR fraction command value produced by a predetermined one of the number of EGR fraction data sets, as a function of a control value produced by said data subset selection logic.

5. A system for generating charge flow commands for an air handling system of an internal combustion engine, the system comprising:

means for determining engine rotational speed;

a memory unit having a number of charge flow data sets stored therein, each of said number of charge flow data sets producing a different charge flow command value as a function of said engine rotational speed and an engine fueling command;

means for determining ambient air density;

means for determining engine operating temperature;

data subset selection logic selecting a subset of said number of charge flow data sets as a function of an emission level cap value and of either of said ambient air density and said engine operating temperature; and charge flow determination logic producing the charge flow command from said subset of said number of charge flow data sets as a function of said engine rotational speed and said engine fueling command.

6. The system of claim 5 wherein said data subset selection logic includes:

ambient air data set determination logic producing a first subset of said number of charge flow data sets and a first optimum data subset value having a value between selected adjacent ones of said number of charge flow data sets forming said first subset, as a function of said emissions level cap value and of said ambient air density;

engine operating temperature data set determination logic producing a second subset of said number of charge flow data sets and a second optimum data subset value having a value between selected adjacent ones of said number of charge flow a data sets forming said second subset, as a function of said emissions level cap value and of said engine operating temperature; and comparison logic producing an optimum data subset value and said subset of said number of charge flow data sets, said optimum data subset value corresponding to said first optimum data subset value and said subset corresponding to said first subset if said first optimum data subset value is greater than said second optimum data subset value, said optimum data subset value otherwise corresponding to said second data subset value and said subset corresponding to said second subset.

7. The system of claim 6 wherein said charge flow determination logic includes:

first mixing logic producing a first charge flow command value by interpolating between said selected adjacent ones of said subset of said number of charge flow data sets as a function of said optimum data subset value; and second mixing logic producing the charge flow command by interpolating between the first charge flow command value and a charge flow command value produced by a predetermined one of the number of charge flow data sets, as a function of a control value produced by said data subset selection logic.

8. A system for generating EGR fraction commands for an air handling system of an internal combustion engine, the system comprising:

means for determining engine rotational speed;

a memory unit having a number of EGR fraction data sets stored therein, each of said number of EGR fraction data sets producing a different EGR fraction command value as a function of said engine rotational speed and an engine fueling command;

means for determining ambient air density;

means for determining engine operating temperature;

data subset selection logic selecting a subset of said number of EGR fraction data sets as a function of an emission level cap value and of either of said ambient air density and said engine operating temperature; and EGR fraction determination logic producing the EGR fraction command from said subset of said number of EGR fraction data sets as a function of said engine rotational speed and said engine fueling command.

9. The system of claim 8 wherein said data subset selection logic includes:

ambient air data set determination logic producing a first subset of said number of EGR fraction data sets and a first optimum data subset value having a value between selected adjacent ones of said number of EGR fraction data sets forming said first subset, as a function of said emissions level cap value and of said ambient air density;

engine operating temperature data set determination logic producing a second subset of said number of EGR fraction data sets and a second optimum data subset value having a value between selected adjacent ones of said number of EGR fraction data sets forming said second subset, as a function of said emissions level cap value and of said engine operating temperature; and comparison logic producing an optimum data subset value and said subset of said number of EGR fraction data sets, said optimum data subset value corresponding to said first optimum data subset value and said subset corresponding to said first subset if said first optimum data subset value is greater than said second optimum data subset value, said optimum data subset value otherwise corresponding to said second data subset value and said subset corresponding to said second subset.

10. The system of claim 9 wherein said EGR fraction determination logic includes:

first mixing logic producing a first EGR fraction command value by interpolating between said selected adjacent ones of said subset of said number of EGR fraction data sets as a function of said optimum data subset value; and second mixing logic producing the EGR fraction command by interpolating between the first EGR fraction command value and an EGR fraction command value produced by a predetermined one of the number of EGR fraction data sets, as a function of a control value produced by said data subset selection logic.

* * * * *